United States Patent
Takeshima et al.

(10) Patent No.: US 7,123,275 B2
(45) Date of Patent: Oct. 17, 2006

(54) STROBE IMAGE COMPOSITION METHOD, APPARATUS, COMPUTER, AND PROGRAM PRODUCT

(75) Inventors: Hidenori Takeshima, Ebina (JP); Osamu Hori, Yokohama (JP); Takashi Ida, Kawasaki (JP); Nobuyuki Matsumoto, Kawasaki (JP); Yasunori Taguchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 239 days.

(21) Appl. No.: 10/664,878

(22) Filed: Sep. 22, 2003

(65) Prior Publication Data

US 2004/0125115 A1    Jul. 1, 2004

(30) Foreign Application Priority Data

Sep. 30, 2002 (JP) .............................. 2002-288014
Mar. 13, 2003 (JP) .............................. 2003-068968

(51) Int. Cl.
*G09G 5/00* (2006.01)
*G09G 5/02* (2006.01)
*H04B 1/66* (2006.01)

(52) U.S. Cl. .................. 345/629; 345/698; 375/240.16
(58) Field of Classification Search ................ 345/629, 345/634
See application file for complete search history.

(56) References Cited

U.S. PATENT DOCUMENTS

| | | | |
|---|---|---|---|
| 5,659,382 A | * | 8/1997 | Rybczynski .................. 352/46 |
| 6,335,985 B1 | | 1/2002 | Sambonsugi et al. |
| 6,342,900 B1 | * | 1/2002 | Ejima et al. ................. 345/698 |
| 6,665,342 B1 | * | 12/2003 | Brown et al. .......... 375/240.16 |

OTHER PUBLICATIONS

N. Yagi, et al., Gazou Labo, vol. 9, No. 4, pp. 55-60, Nihon Kougyou Shuppan, "Multi Motion", Apr. 1998.
Adobe Premire 6.0 User's Guide, Section 7, Adobe Systems Incorporated, pp. 284-286. "Superimpose and Composition of Images", Dec. 2000.

* cited by examiner

Primary Examiner—Kee M. Tung
Assistant Examiner—Jin-Cheng Wang
(74) Attorney, Agent, or Firm—Oblon, Spivak, McClelland, Maier & Neustadt, P.C.

(57) ABSTRACT

There are disclosed a method, apparatus, computer, and program product for generating a strobe composite image from a plurality of frames of a moving image. A first frame is selected from the plurality of frames of the moving image. A plurality of second frames relating to the first frame are determined. Then, a strobe composite image is generated by superposing the plurality of second frames in accordance with a superposing manner.

3 Claims, 16 Drawing Sheets

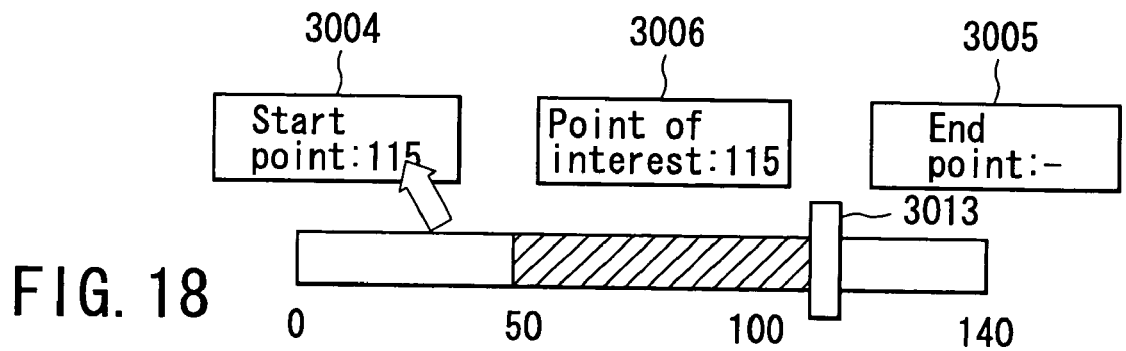
FIG. 18
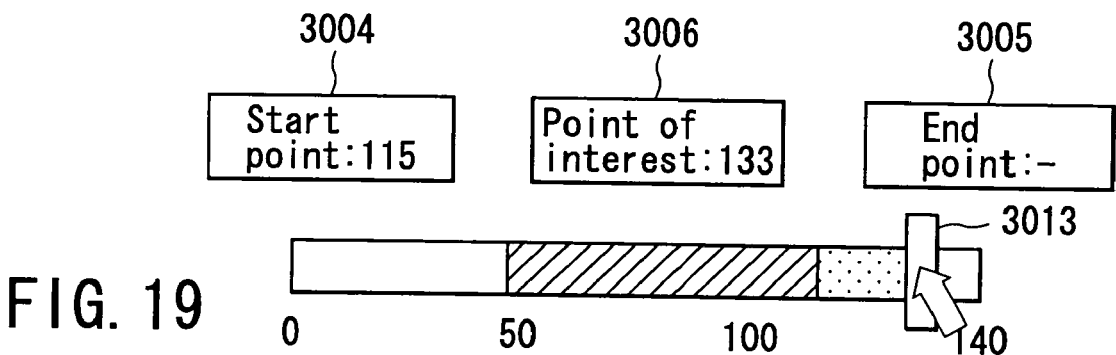
FIG. 19
| Processing frame | Processing contents |
|---|---|
| −15～+4 | Overlay |
| +5～+14 | Underlay |
| −15～+21 | Overlay |
FIG. 20

STROBE IMAGE COMPOSITION METHOD, APPARATUS, COMPUTER, AND PROGRAM PRODUCT

CROSS-REFERENCE TO RELATED APPLICATIONS

This application is based upon and claims the benefit of priority from the prior Japanese Patent Applications No. 2002-288014, filed Sep. 30, 2002; and No. 2003-068968, filed Mar. 13, 2003, the entire contents of both of which are incorporated herein by reference.

BACKGROUND OF THE INVENTION

1. Field of the Invention

The present invention relates to a method, apparatus, computer, and program product for generating a strobe composite image by superposing time-serially obtained object images.

2. Description of the Related Art

An image processing technique for generating and displaying a composite image by extracting only an object portion from a moving image and superposing it on another image is effective to generate a strobe composite image by superposing object images sensed at a plurality of times. In this case, if a user interface that allows the user to superpose a plurality of object images is not available, the user cannot easily generate a strobe composite image, and must spend much time in operations.

Conventionally, a technique for superposing a plurality of image components called layers each having a transparent portion has been used to generate a strobe composite image by superposing a plurality of object images (for example, see reference "Adobe Premier 6.0 Manual, Chapter 7, pp. 281–294"). Initially, only object image regions are extracted from a moving image by an arbitrary method. In this process, a chroma-key method that senses motion of an object in front of a uniform color background, and extracts object images by exploiting color component differences can be adopted. Then, the extracted object image regions are copied to form a plurality of layers using a layer function of image processing software, and a strobe composite image can be obtained by superposing these layers.

However, in order to create a strobe composite image by the conventional technique, the user must manually create layers corresponding to frames, and must manually designate the superposing manner as a hierarchy upon creating layers or must manually adjust the hierarchy of layers after the layers are created. Also, in the conventional technique, the user must execute strobe composition by capturing an image which is to undergo strobe composition, and saving it in a file. For example, if it is impossible to photograph an object in front of a uniform background like in sport games, the chroma-key method cannot be used to extract an object portion from an image. Therefore, a manual extraction process is required, thus taking much time until a strobe composite image is created.

It is often required to shorten the time period required from when an image is obtained until a strobe composite image is created, since the strobe composite image is often used in comments of, e.g., the form of a player in a television live program. Such requirements cannot be met since it takes much time to create a strobe composite image using the conventional technique. Therefore, a method of generating a desired strobe composite image within a short period of time is demanded.

BRIEF SUMMARY OF THE INVENTION

The present invention has as its object to provide an image composition method, apparatus, computer, and program product, which can reduce the load on the user upon generating a strobe composite image, and can shorten the time required for an image generation process.

A method, apparatus, computer, and program product according to an embodiment of the present invention generate a strobe composite image from a plurality of frames of a moving image. A first frame is selected from the plurality of frames of the moving image. A plurality of second frames relating to the first frame are determined. Then, a strobe composite image is generated by superposing the plurality of second frames in accordance with a superposing manner.

BRIEF DESCRIPTION OF THE SEVERAL VIEWS OF THE DRAWING

FIG. 18 shows a state after the second start point is set in range designation;

FIG. 19 shows selection of the second end point in range designation;

FIG. 20 shows an example of storage data corresponding to the setup contents of the superposing manner;

DETAILED DESCRIPTION OF THE INVENTION

Embodiments of the present invention will be described hereinafter with reference to the accompanying drawings.

Figure 1:
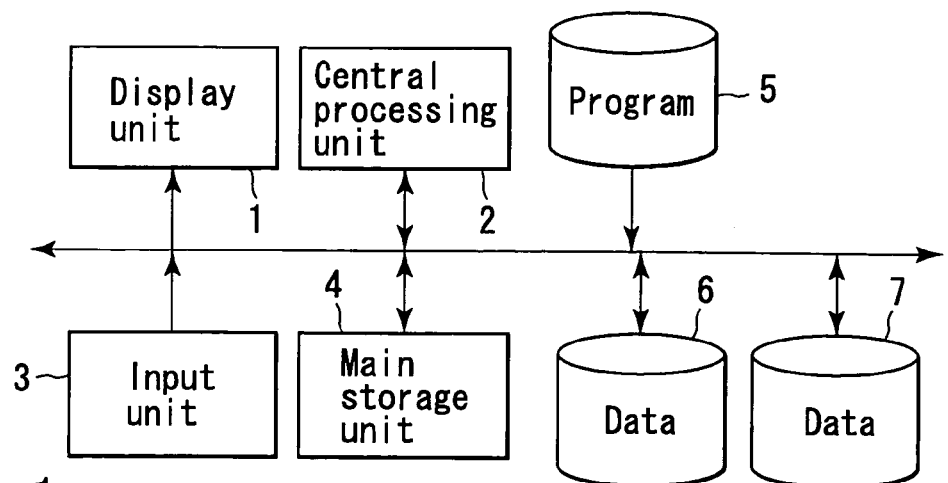
FIG. 1 is a schematic block diagram showing the arrangement of an image composition apparatus according to the first embodiment of the present invention.

(First Embodiment) FIG. 1 is a schematic block diagram showing the arrangement of an image composition apparatus according to the first embodiment of the present invention. As shown in FIG. 1, an image composition apparatus of this embodiment comprises a display unit 1 which displays an input video, various windows used to generate and edit and a strobe composite image based on the input video, and the like, a central processing unit (CPU) 2, an input unit 3 which comprises a keyboard, pointing device (mouse), and the like, and a main storage unit 4. A program 5 used to generate and edit a strobe image, input video data 6, and generated strobe image data 7 are recorded in an external storage device such as a hard disk device, magnetooptical disk device, or the like.

The image composition apparatus of this embodiment can be implemented as software which runs on a versatile computer. In this case, the computer program 5 that implements the process for generating and editing a strobe image is read out onto the main storage unit 4, and is executed by the CPU 2. Note that the arrangement of this embodiment incorporates an operating system (OS) that controls hardware of the computer and provides a file system and graphical user interface (GUI). In such arrangement, the computer program which implements the process for generating and editing a strobe image is installed as application software which runs on the operating system.

Prior to a detailed description of the processing operation of the image composition apparatus according to this embodiment, a schematic sequence of strobe composition will be explained. In strobe composition, an input image is a moving image, and an output image is a strobe composite image (moving or still image). In order to generate an output strobe composite image from the input moving image, an object extraction step of extracting only object portions which are to undergo strobe composition from the input image, and a step of designating a strobe composition object that represents frames and a manner of superposing the frames so as to implement strobe composition are required. These two steps are independent from each other, and either of these steps can be executed first.

Figure 2:
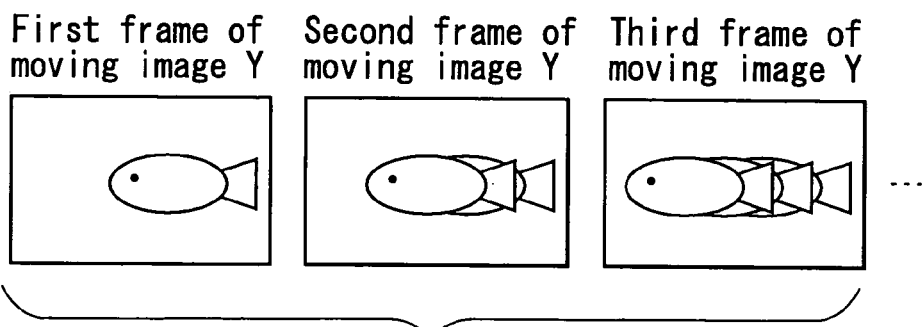
FIG. 2 shows the superposing state of frames.

Let X be an input moving image of an object. Then, strobe composite image Y is generated as follows. That is, the first frame of moving image Y is determined as an image of that of moving image X, and the second frame of moving image Y is generated by superposing the second frame of moving image X on the first frame of moving image Y. The third frame of moving image Y is generated by superposing the third frame of moving image X on the second frame of moving image Y. Furthermore, the (k+1)-th (k is a natural number) frame of moving image Y is generated by superposing the (k+1)-th frame of moving image X on the k-th frame of moving image Y. Then, appropriate times are assigned to respective frames of moving image Y to generate a moving image. FIG. 2 shows respective frames of moving image Y.

In this case, frames are overlaid on each other. However, frames corresponding to a user's underlay instruction may be underlaid. Even when only discrete frames are used, as will be described later, frames are overlaid or underlaid in accordance with the time series of input object images. The time series of input object images need not be the same as that upon photographing an object. For example, the reverse order of the time series, i.e., reverse playback, may be used.

The frames to be superposed need not always be consecutive, but may be discrete. Especially, the user often wants to select every N-th frames (N is an integer) to be superposed. Hence, a user interface that allows the user to select every N-th frames to be superposed from the A-th to B-th frames (A, B, and N are integers) may be provided.

For example, when every other frames are selected as frames to be superposed like frame Nos. 1, 3, 5, 7, and 9 from a moving image including 10 frames from frame Nos. 0 to 9, a composite image can be generated from only odd frames of an interlaced-scan moving image.

Figure 3:
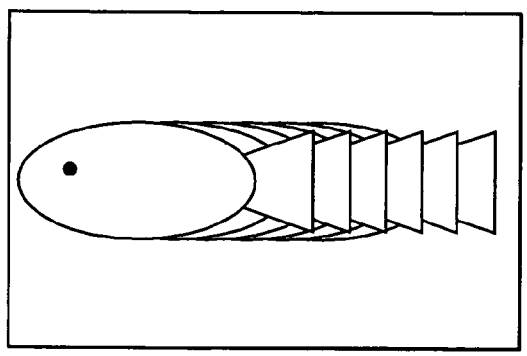
FIG. 3 shows a strobe composite image generated from a slow moving object image.
Figure 4:
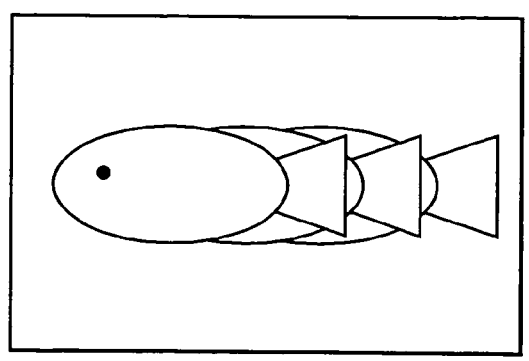
FIG. 4 shows a strobe composite image generated by decimating some frames.

As another example, when an object moves relatively slowly, if all frames are selected as those to be superposed, a strobe composite image is complicated (e.g., FIG. 3). In such case, when some frames are decimated (e.g., every other frames are selected as those to be superposed), a plain strobe composite image is obtained, as shown in FIG. 4.

Figure 5:
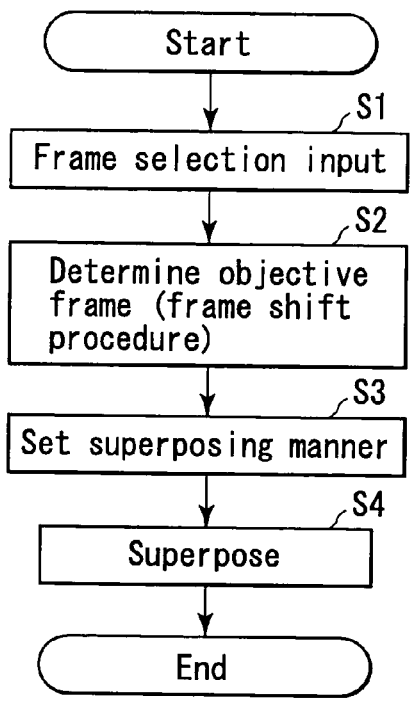
FIG. 5 is a flow chart showing a series of procedures of strobe image composition according to the first embodiment.
Figure 6:
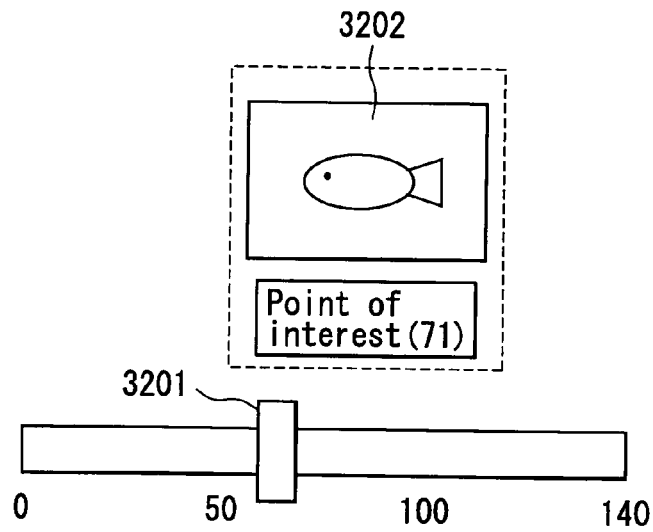
FIG. 6 shows an example of an interface which comprises a slider used to select a point of interest.

An interface which makes the user designate one frame and also the superposing manner to composite a strobe image is provided. Using this interface, a series of procedures shown in FIG. 5 are executed. Initially, a frame select/input procedure is executed (step S1) to wait for one frame selected by the user. If the user has selected one frame, a frame shift procedure for calculating and determining an objective frame which is commonly called as an IN or OUT point is executed (step S2). The objective frame obtained by the frame shift procedure undergoes a superposing manner setting procedure (step S3). Finally, a superposing procedure is executed to obtain a strobe composite image (step S4). In the frame select/input procedure (step S1), as shown in, e.g., FIG. 6, an interface that displays a slider 3201 and the currently selected frame 3202 is presented to the user. On this interface, the user can select a desired frame by operating the slider 3201 using a mouse or keyboard.

Figure 7:
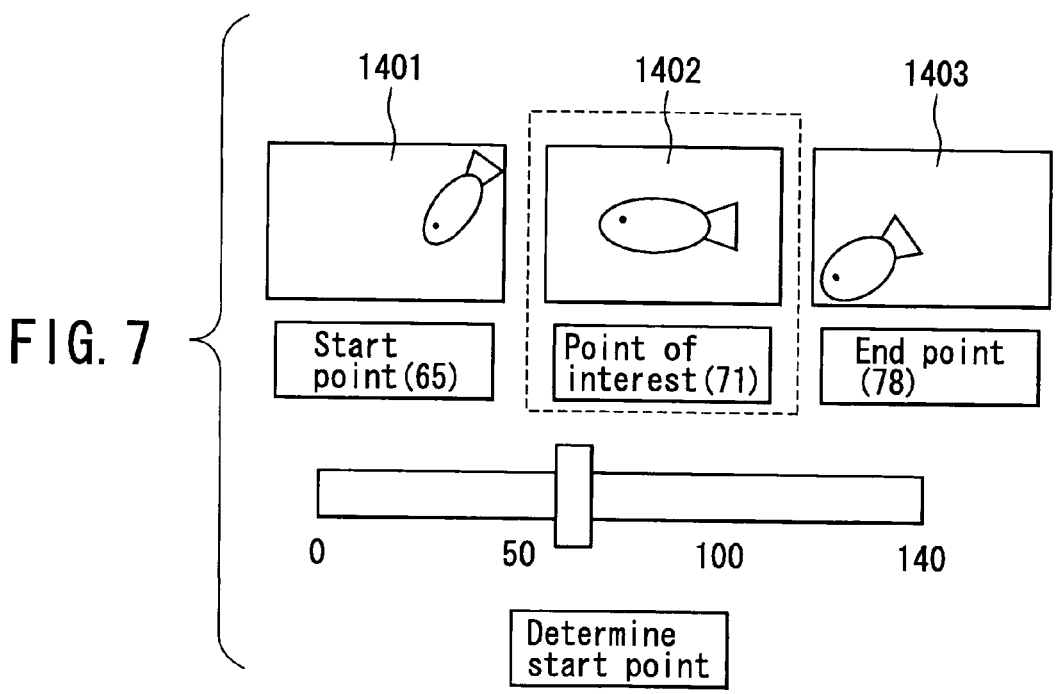
FIG. 7 shows an example of a window to be presented to the user to designate a composition start point.

In the frame select/input procedure, a plurality of frames may be presented. For example, when the currently selected frame (frame 1402 of interest) and frames 1401 and 1403 before and after that frame are displayed, as shown in FIG. 7, if the interface is designed to allow the user to select a frame not only by means of the slider but also by clicking a frame itself (1401 to 1403), the frame selection operation can become more intuitive and easier to use for the user. Alternatively, frames obtained as a result of the frame shift procedure of the currently selected frame are preferably presented. As a result, the user can immediately recognize frames designated by the currently selected contents.

In the superposing manner setting procedure (step S3), for example, the objective frame is set as one of the start and end points of strobe composition. When strobe composition is made by superposing N consecutive frames (N is a natural number) from a specific start frame to a specific end frame on (or under) the next frames in turn, the start frame is set as the start point of strobe composition, and the end frame is set as the end point. Note that frames need not always be consecutive, and the start and end points may be similarly determined for an arbitrary number of discrete frames. Also, based on user's frame selection, a plurality of frame shift procedures and superposing manner setting procedures may be simultaneously executed. For example, both the start and end points of strobe composition may be simultaneously determined based on one designated frame.

A method of designating the start point of strobe composition will be described below with reference to FIG. 7. FIG. 7 shows an example of a window to be presented to the user to designate the start point. In this embodiment, assume that M frames from a frame N frames before the frame of interest are to undergo strobe composition, and N and M (integers) are determined in advance. When the user has selected the frame 1402 of interest (frame No. 71 in this example), it is determined that overlay strobe composition is designated to have a frame N frames before the frame of interest (frame No. 65 in this example) as a start frame (start point), and a frame M frames after the start frame (frame No. 78 in this example) as an end frame (end point). When the user presses a "start point determination" button, composition is executed.

Note that execution of strobe composition need not always be started in response to depression of the "start point determination" button. For example, an interface may be designed to determine that an "overlay" button is pressed while the start to end frames have been selected, and to wait for a composition execution instruction. An image to be presented may be either an extracted object or an image before extraction. In the above example, the end frame is defined. However, only the start point may be selected without determining M.

Figure 8:
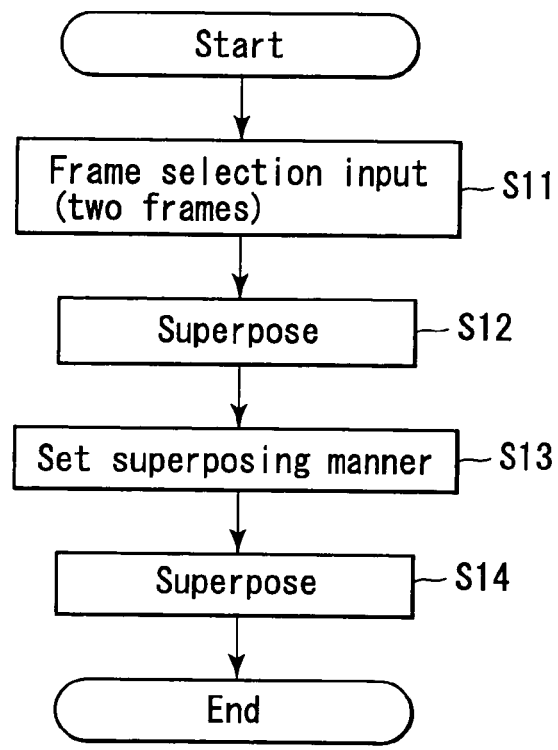
FIG. 8 is a flow chart showing the procedures for changing a superposing manner by designating an objective range.

(Second Embodiment) An interface which makes the user designate two frames and also the superposing manner to implement strobe image composition will be explained below. Based on this interface, the procedures shown in FIG. 8 are executed. In order to quickly obtain a strobe composite image by minimum required user operations, the first embodiment is preferably used. However, when the user wants to strictly designate the start and end points (frames) of strobe composition, the interface of the second embodiment is effective. In this embodiment, the superposing manner of some frames of the already created strobe composite image can be changed to generate an image again.

The frame select/input procedure is executed to wait for two frames (start and end points) selected by the user in this embodiment (step S11). If the user has selected the frames, frames between the two selected frames are determined as those to be processed, and are superposed (step S12). In this embodiment, the superposing manner is changed (step S13), and the superposing procedure is executed again to obtain a strobe composite image (step S14).

Figure 9:
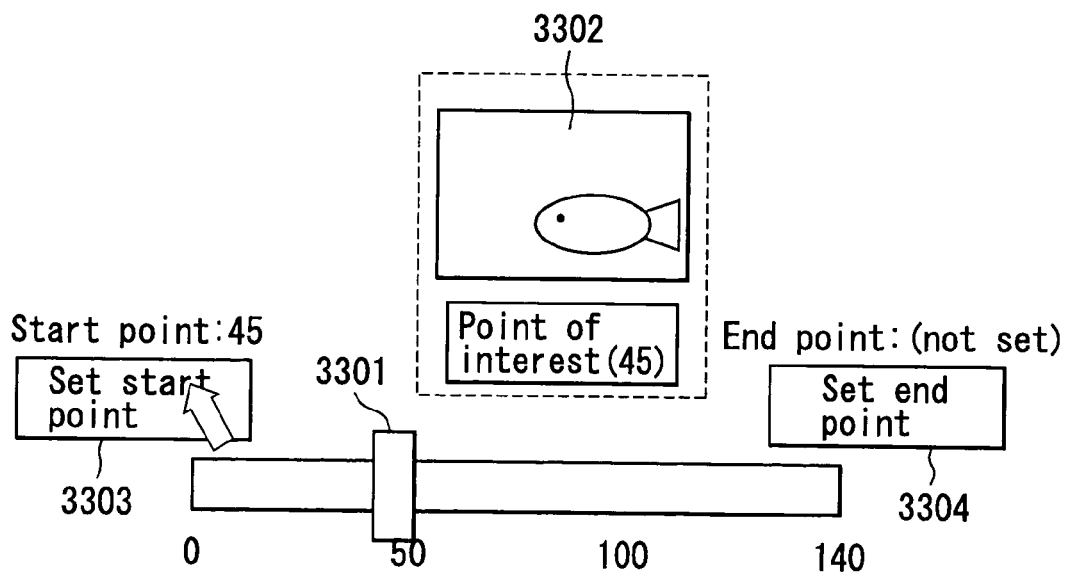
FIG. 9 shows an example of an interface which allows the user to select two frames as start and end points.
Figure 10:
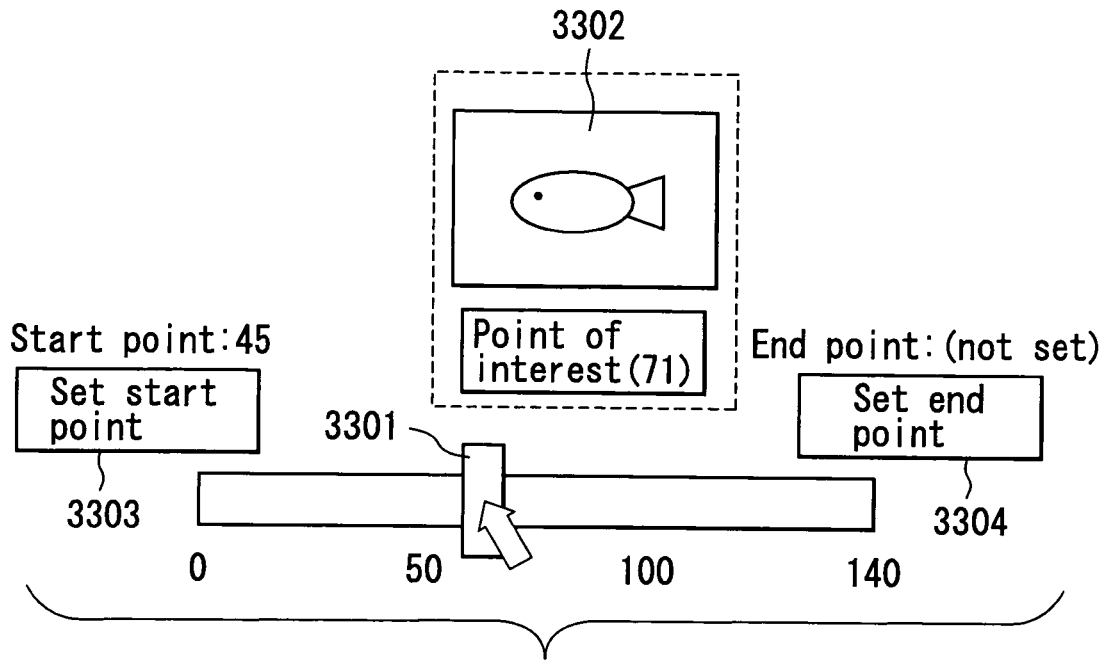
FIG. 10 shows a slider operation state on the interface in FIG. 9.
Figure 11:
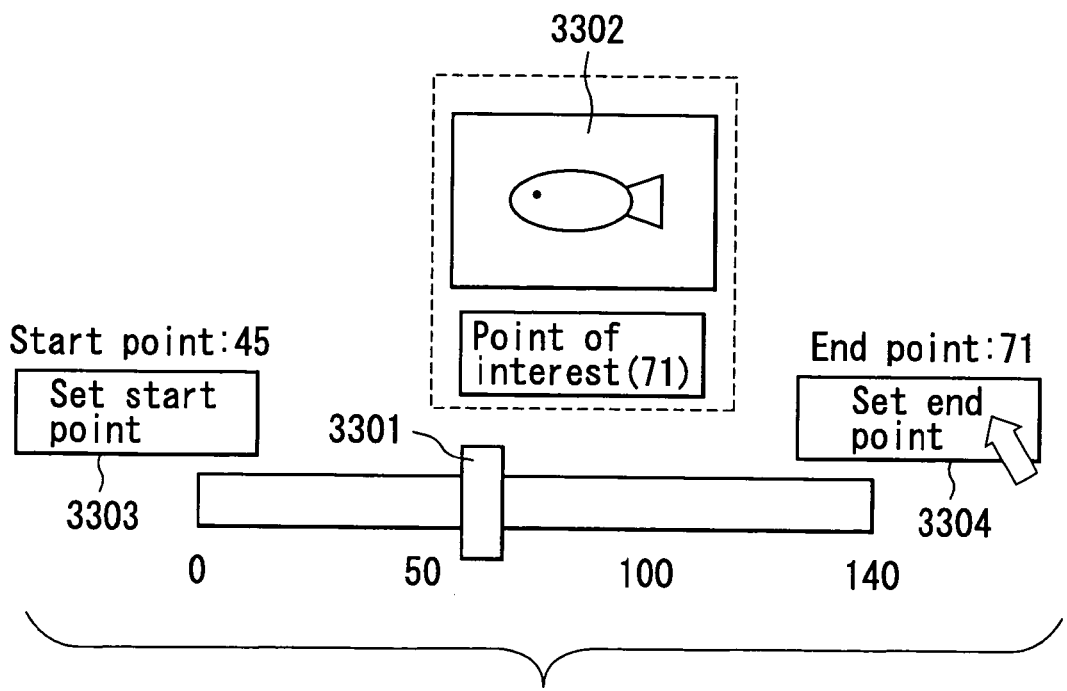
FIG. 11 shows an end point setting state on the interface in FIG. 9.

An interface which presents a frame select window presents one slider 3301, and a frame 3302 to be selected by this slider 3301, as shown in, e.g., FIG. 9, and makes the user select two frames from the slider. Buttons 3303 and 3304 are used to set the current point of interest as the start and end points, respectively. FIG. 9 illustrates a state wherein the user has pressed the button 3303 to set the point of interest (frame No. 45) as the start point. The user moves the slider 3301, as shown in FIG. 10, and sets the point of interest (frame No. 71) as the end point using the button 3304, as shown in FIG. 11. As in the first embodiment, when the user selects a frame using the slider 3301, not only the currently selected frame but also frames before and after that frame may be presented, and the user may select a frame by directly clicking it in addition to selection using the slider 3301. Thus, the frame selection operation becomes more intuitive and easier to use.

As the superposing manner in step S12, an arbitrary method may be used. For example, frames may be superposed in turn in ascending or descending order of time stamp.

Figure 12:
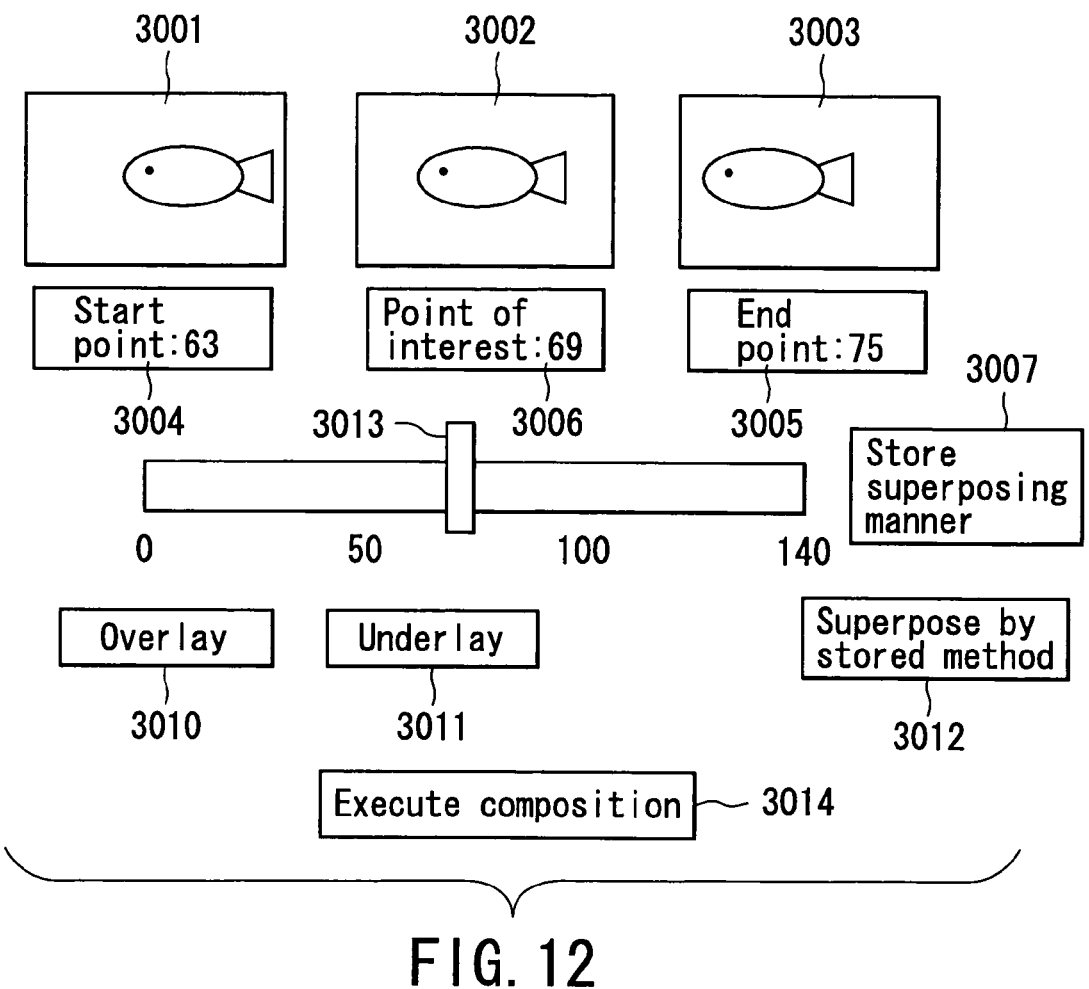
FIG. 12 shows an interface used to designate a range.

A case will be exemplified below wherein a designated range is to be superposed in association with the series of procedures shown in the flow chart of FIG. 8. FIG. 12 shows an example of a window to be presented to the user in this case. The interface to be described below makes the user select the first frame of objective frames using a button 3004 with text, and also select the last frame of the objective frames using a button 3005 with text. In FIG. 12, reference numerals 3001 and 3003 denote fields which display frame images in correspondence with the buttons 3004 and 3005. With these images, the user can recognize the contents of the currently selected frames at a glance. A button 3006 with text displays the frame number of the current frame of interest, and a field 3002 displays an image corresponding to that frame number. The user can move the point of interest by moving a slider 3013 to the right or left by means of a mouse or keyboard input. Prior to selection of frames, the user can designate a superposing manner using exclusive push buttons 3010 and 3011. These buttons are mutually exclusive: when the user presses one of these buttons, the other button is restored to a non-pressed state.

FIGS. 13 to 19 show the buttons 3004, 3005, and 3006, and the slider 3013 extracted from FIG. 12. A series of operations for selecting the first and last frames to be selected will be described below with reference to these drawings. Display objects of the buttons 3004, 3005, and 3006 can display text that indicates button names, and numerical values that indicate the frame positions (numbers) (these buttons will be referred to as "buttons with text" hereinafter). Note that the display contents of a numerical value on each button are updated in accordance with an operation of the slider 3013 and a settlement instruction for that button.

Figure 13:
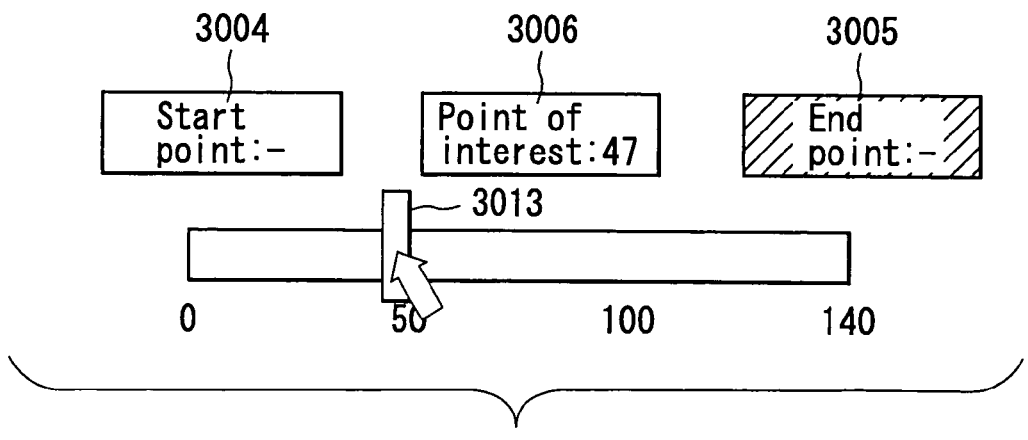
FIG. 13 is a view for explaining range designation by means of the interface in FIG. 12, i.e., shows a state wherein the point of interest is moved to the start point.
Figure 14:
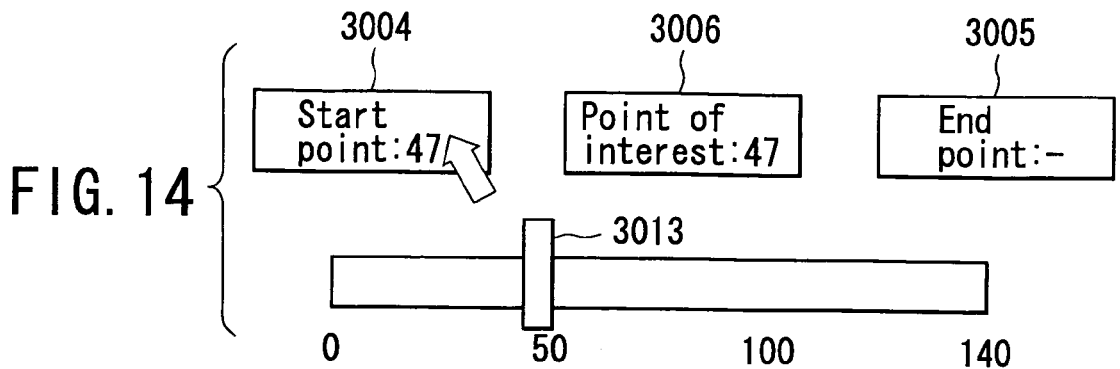
FIG. 14 shows determination of the start point in range designation.

When the interface is presented to the user for the first time, neither a start point nor end point are designated at that time. In this state, the end point is grayed out, and its button cannot be pressed, as shown in FIG. 13. The user moves the point of interest to a frame that he or she wants to set as the start point. The user then presses the button 3004 with text of the start point to set the current point of interest as the start point, as shown in FIG. 14.

Figure 15:
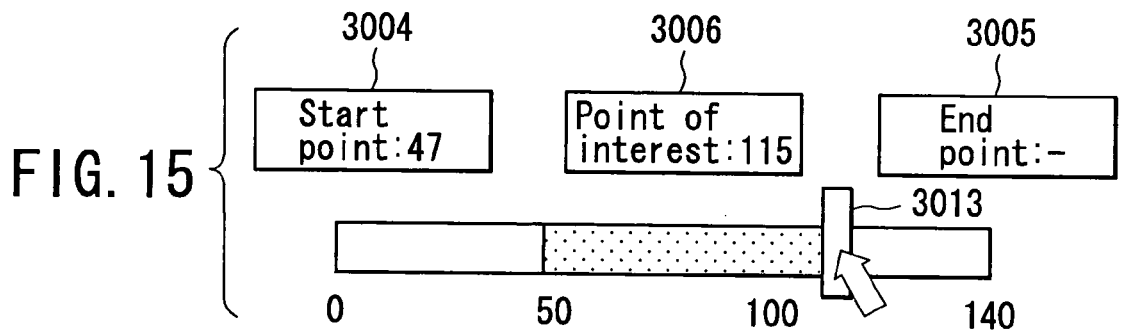
FIG. 15 shows a state wherein the point of interest is moved to the end point in range designation.
Figure 16:
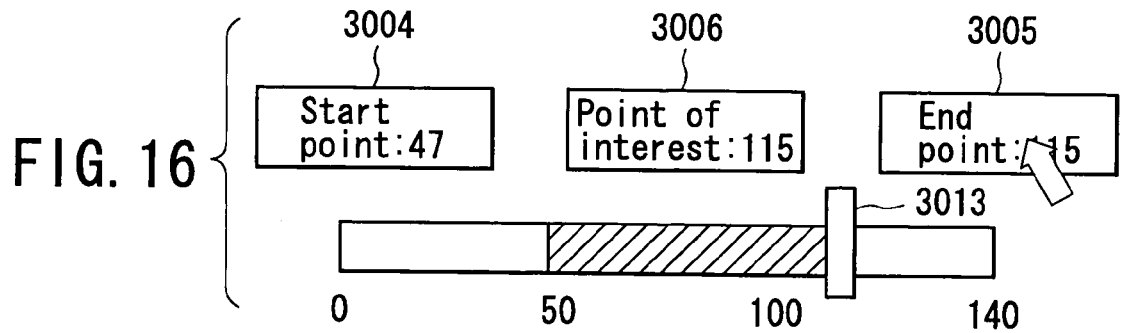
FIG. 16 shows determination of the end point in range designation.
Figure 17:
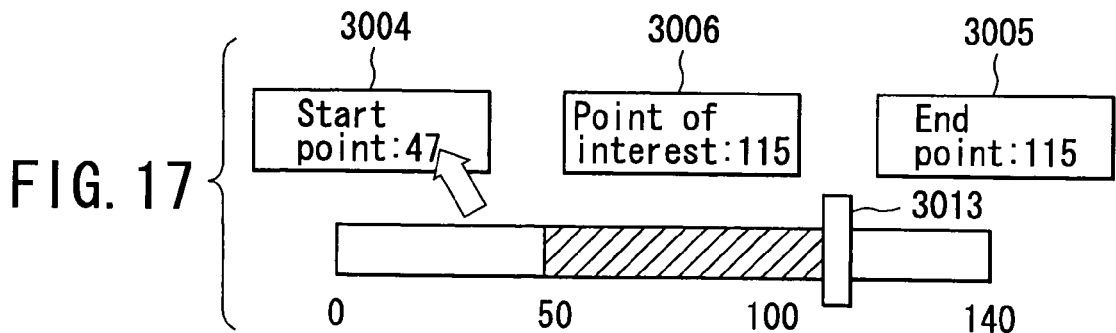
FIG. 17 shows a state upon setting the second start point in range designation.

The user moves the point of interest to a frame that he or she wants to set as the end point, as shown in FIG. 15. At this time, since objective frames are not settled, they are indicated in light color. When the user presses the button 3005 with text of the end point, the end point is settled. The user can make superposing designation of the objective frames by pressing one of the exclusive push buttons 3010 and 3011, which are used to designate the superposing manner at that time. When the user presses the button 3005 with text of the end point once again in the state shown in FIG. 16, the settled contents are canceled to revert the state shown in FIG. 15. When the user presses a "composition execution" button 3014 in the state shown in FIG. 16, strobe composition is executed. On the other hand, when the user selects the frame of interest again in the state shown in FIG. 16, and presses the start point button again, as shown in FIG. 17, he or she can make superposing designation of another strobe image for a new period after superposing designation made so far, as shown in FIG. 18. The user makes the same objective frame selection operations as those described above, i.e., selects the end point of this new period, as shown in FIG. 19, changes the depression states of the exclusive push buttons 3010 and 3011 as needed, and so forth, thus making superposing designation of another set of objective frames.

A button 3007 is used to store the current superposing setup contents in the storage unit 4. For example, the superposing setup contents indicate superposing processes to be applied to frames at relative positions from the current point of interest, as shown in FIG. 20. When the user selects the point of interest and presses a button 3012, the saved superposing setup contents are loaded and applied. By calling the saved setup in this way, the edit time can be shortened. Some pre-stored different setups may be prepared as a list, and that list may be presented in response to a user's request to load another setup. In this way, a plurality of different setups can be preferably selectively used.

The current superposing setup contents stored in the storage unit 4 may be permanently recorded using a recording unit such as an HDD or the like, and may be read out and applied to composition of another strobe image. That is, the readout superposing setup may be applied to a frame group, different from the currently processed frame group later, to composite another strobe image.

Also, a plurality of superposing setups with different contents are recorded in the recording unit to simultaneously generate strobe composite images corresponding to these superposing setups. Furthermore, a plurality of strobe composite images may be generated on the basis of one arbitrary superposing setup. It is preferable to make only superposing setup processes in advance, and to simultaneously execute image generation processes later in terms of high work efficiency.

An interface which is used when a strobe composite image is generated and presented once by overlaying all frames, and is generated again using objects designated by the user from these frames while changing the superposing manner to the underlay manner will be described below. Such processes correspond to the procedures in steps S13 and S14 in FIG. 8.

Figure 21A:
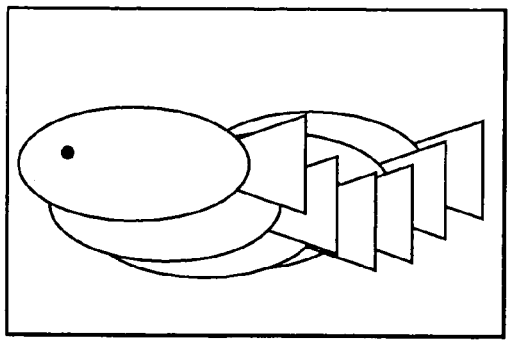
FIGS. 21A to 21C show modification examples of the superposing manner.
Figure 21B:
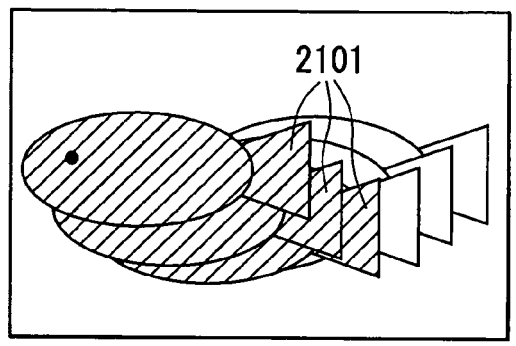
Figure 21C:
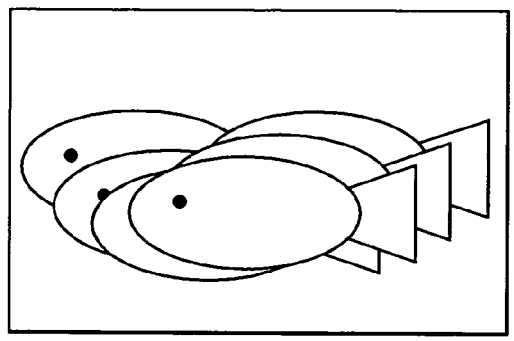

As shown in FIGS. 21A to 21C, a composite image is displayed by overlaying frames (FIG. 21A). In this state, the user selects, e.g., objects 2101 of three left object images by clicking the left button of a mouse. The selected objects 2101 are preferably displayed in a color different from other objects (FIG. 21B). When the user clicks the right button of the mouse, the superposing manner of these three selected objects 2101 is switched to the underlay manner, and a new composite image is displayed, as shown in FIG. 21C. In place of presenting all frames as an overlaid image, the interface shown in FIG. 12 may be presented in advance. Then, when the user clicks the right button of the mouse, overlaid objects may be changed to underlaid objects, and vice versa. In this way, two processes, i.e., designation of a rough superposing manner, and adjustment of superposing manners for respective frames can be attained within a short period of time.

In this embodiment, the interface which allows the user to select objective frames from a strobe composite image, and to additionally designate to change their superposing manner has been explained. If an interface which can also change the superposing order when the user selects objective frames from a strobe composite image is added, the time required to create and edit a strobe composite image can be further shortened. Note that changing a strobe composite image at the instance of clicking requires high processing power of the image composition apparatus, and also operator's skills to cope with an instantaneous change in screen. Hence, such process is preferably selectively used according to situations.

In the above description, a frame is selected using the slider. Alternatively, for example, some representative frames may be presented to prompt the user to select one of these representative frames. Then, only frames near the selected representative frame may be presented to prompt the user to input a superposing instruction. In this way, the aforementioned slider operation can be omitted.

As described above, since the interface which can minimize user's operations required for strobe composition is provided, the strobe composition execution sequence can be clarified, and the operation load on the user can be greatly reduced. Therefore, the time required to create a strobe composite image can be shortened, and the usability of the image composition system can be improved.

(Third Embodiment) The third embodiment which comprises an interface that presents a preview during a manual extraction process will be described below with reference to FIGS. 22 to 27. A situation in the middle of a user's manual extraction process of an object image from input video frames Ia to Ic shown in FIG. 22 will be examined. Note that the object image is a fish that is swimming from the right to the left on the plane of the drawing. The user has already extracted object images from the first and second frames Ia and Ib. The user is about to extract an object image from the third frame Ic.

Figure 23:
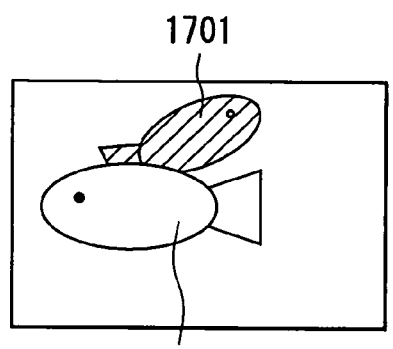
FIG. 23 shows one frame to be manually extracted.
Figure 22:
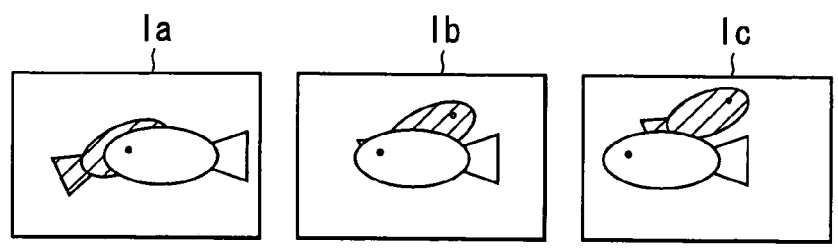
FIG. 22 is a view for explaining a preview presentation interface according to the third embodiment of the present invention, i.e., shows a series of input video frames.
Figure 24:
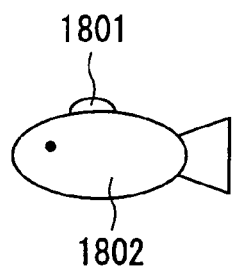
FIG. 24 shows the manual extraction result of the frame shown in FIG. 23.
Figure 25:
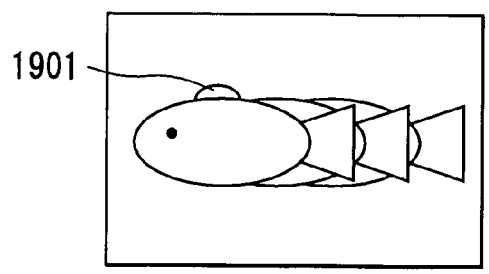
FIG. 25 shows a generation example of a strobe composite image including the frame shown in FIG. 24.

As shown in FIG. 23, the user is extracting an object image 1702 so as not to include an object image 1701. If a portion 1801 of the image is inaccurately extracted, as shown in FIG. 24, its influence appears as an unwanted portion 1901 in a strobe composite image, as shown in FIG. 25, resulting in deterioration of image quality of the strobe composite image.

Figure 26:
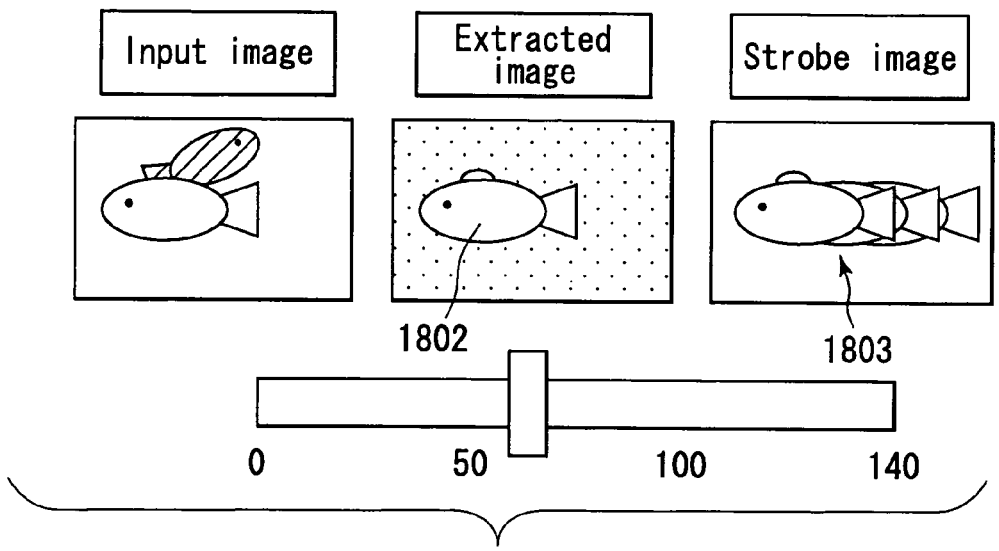
FIG. 26 shows an example of a preview presentation interface.
Figure 27:
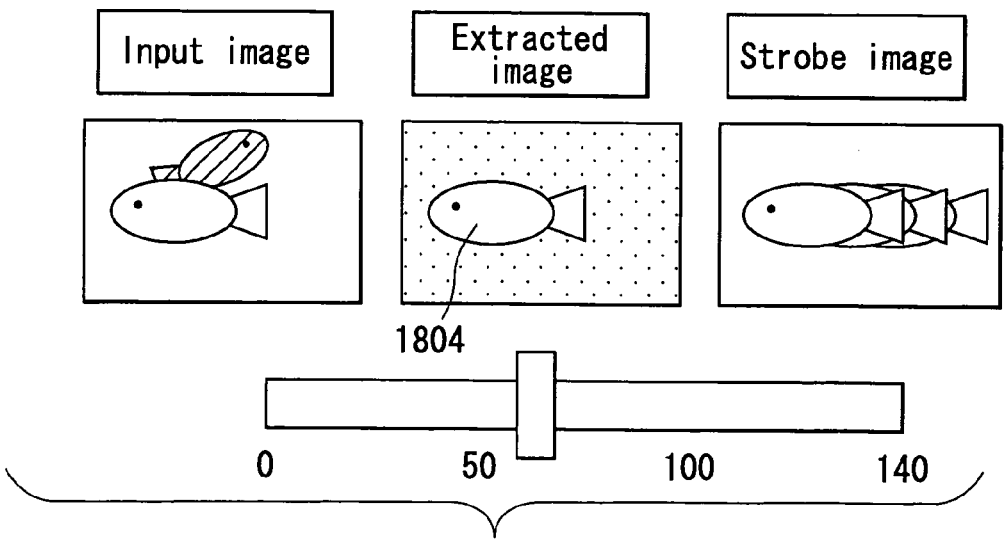
FIG. 27 shows a state after a modification process on the preview presentation interface.

As shown in FIG. 26, in addition to the input image and extracted image, an image 1803 after strobe composition based on a currently extracted image 1802 is sequentially superposed and is displayed as a preview. The user can immediately confirm a portion which is extracted inaccurately and adversely influences a strobe composite image, and can easily correct such portion to obtain a desired strobe composite image. As shown in FIG. 27, the user can immediately confirm a corrected strobe composite image 1804.

Note that "preview" amounts to presenting the processing result based on the current instruction contents before actual processing, and sequentially updating and presenting a complete image (may be either a still or moving image) in accordance with, e.g., frames to be superposed selected by the user.

Note that not all of the input image, extracted image, and strobe composite image need always be presented, and only two images, e.g., the input image and strobe composite image may be presented. Also, a preview may be presented not only when the user manually extracts an object image but also when the user corrects an automatic or semi-automatic extraction result of software.

When an object is extracted from an image region such as a background or the like, which does not change along with the elapse of time, inaccurate extraction does not influence a strobe composite image, and the user need not spend much time for such extraction. When a preview is presented, the user can confirm it. Therefore, the time required to generate a strobe composite image can be shorted while saving labor.

The user can recognize a final image during an edit process, and need not check if a strobe composite image is obtained as he or she had expected after generation of it. In this way, sequential presentation of a strobe composite image as a preview greatly contributes to shortening the time required to generate the strobe composite image and reduction of the load on the user compared to presentation of an extracted image as a preview.

Figure 28:
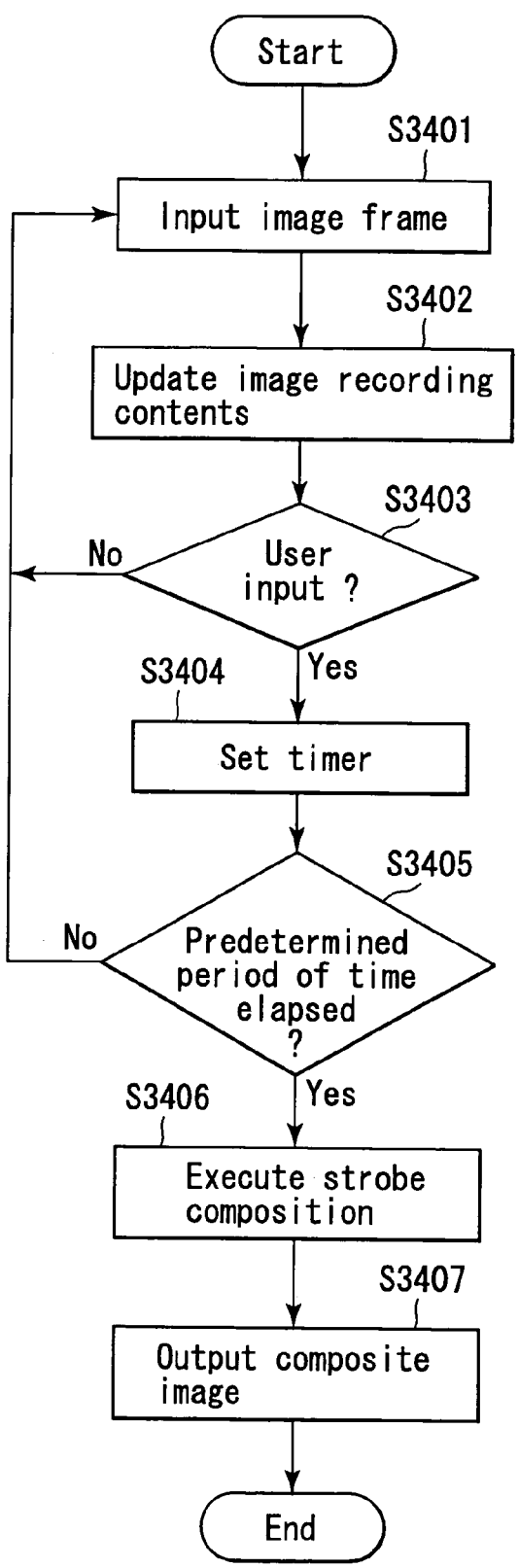
FIG. 28 is a flow chart of a strobe image composition method according to the fourth embodiment of the present invention.

(Fourth Embodiment) FIG. 28 is a flow chart showing a series of processes of strobe image composition according to the fourth embodiment of the present invention. In this embodiment, upon reception of a user's instruction (example: depression of a button, clicking of a mouse button, and the like) during capturing a moving image, generation of a strobe composite image starts in response to that instruction as a trigger. An input device is, for example, a camera which captures a moving image, and is connected to a strobe composition system when it is used. A system that practices the fourth embodiment will be referred to as a 1-instruction type strobe composition system hereinafter. This system has a queue (first-in, first-out (FIFO) buffer) for saving a moving image. Note that a multi-stage delay circuit may be used in place of the queue.

The 1-instruction type strobe composition system repeats steps S3401 and S3402 shown in FIG. 28 unless an one-click-instruction is detected. This instruction may be done by clicking a mouse or switch by the user, and is referred to as "one-click-instruction". An image input step (S3401) of capturing the next image frame from the input device, and an image holding step (S3402) of shifting the queued frames by one frame by discarding the first frame in the queue, and adding the captured frame as the last frame are repeated.

Upon detection of an one-click-instruction (S3403: user input step), the 1-instruction type strobe composition system sets a timer which generates notification (time out) at least once when a predetermined period of time elapses after the detection time of the instruction (S3403), and proceeds with processes in steps S3401 and S3402. If the timer generates notification (S3405), the system executes strobe composition using images saved in the queue (S3406): image composition step) and outputs a composite image (S3407: image output step). According to this embodiment, since the user need only input one instruction alone, the load on the user can be greatly reduced, and the time required to generate a strobe composite image can also be greatly shortened.

Figure 29:
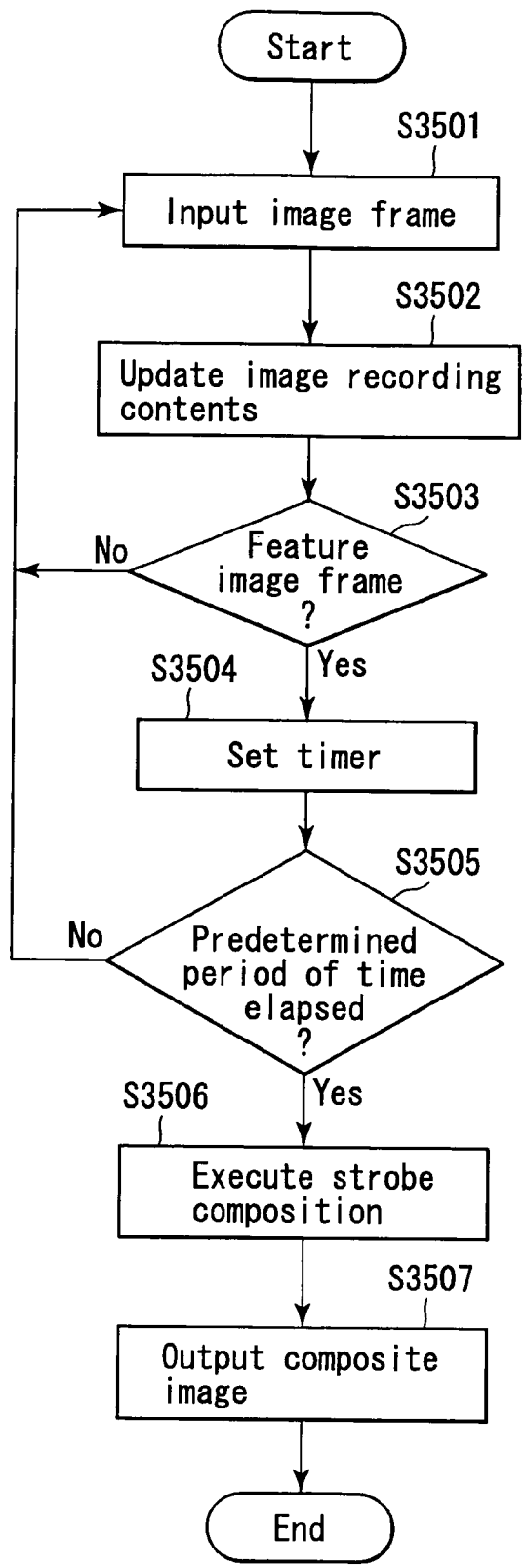
FIG. 29 is a flow chart of a strobe image composition method according to the fifth embodiment of the present invention.

(Fifth Embodiment) FIG. 29 is a flow chart showing a series of processes of strobe image composition according to the fifth embodiment. This embodiment automatically detects a frame which is important upon executing strobe composition (to be referred to as a "feature image frame" hereinafter) during capturing of a moving image, and generation of a strobe composite image starts in response to that detection as a trigger. Such system of the fifth embodiment will be referred to as a "fully automatic strobe composition system" hereinafter.

As in the fourth embodiment, the fully automatic strobe composition system according to this embodiment has a queue (FIFO buffer) for saving a moving image. This system repeats steps S3501 to S3503 to be described below. That is, the system repeats an image input step (S3501) of capturing the next image frame from the input device, an image holding step (S3502) of shifting the queued frames by one frame by discarding the first frame in the queue, and adding the captured frame as the last frame, and a feature image frame detection step (S3503) of checking whether or not a feature image frame is present.

If a feature image frame is present, the fully automatic strobe composition system sets a timer which generates notification (time out) at least once when a predetermined period of time elapses after the detection time of the feature frame (S3504), and proceeds with processes in steps S3501 to S3503. If the timer generates notification (S3505), the system executes strobe composition using images saved in the queue (S3506): image composition step) and outputs a composite image (S3507: image output step).

As described above, according to this embodiment, no user's instruction is required, and the time required to generate a strobe composite image can be further shortened compared to the fourth embodiment. In the fourth and fifth embodiments that detect a user's instruction or feature image frame, the timer is used. Alternatively, times may be recorded at given time intervals, and an elapse of a predetermined period of time may be detected. In the fully automatic strobe composition system, various methods of determining a feature image frame and detecting such frame may be used. Such methods will be explained taking a strobe composite upon hitting a tee shot at golf as an example. For example, strobe image composition conformity conditions include:

(1) A sound produced upon hitting a tee shot is detected, and an image frame at the time of detection of the sound is determined as a feature image frame.

(2) An object shape (template) in a feature image frame is prepared in advance, an object region is extracted from each image frame, and when it is determined that the extracted object shape is sufficiently similar to the template, that frame is determined as a feature image frame.

(3) Templates of an object for a feature image frame and several frames before and after the feature image frame are prepared in advance, an object region is extracted from each image frame, and when it is determined that the shapes of the object for several successive frames are sufficiently similar to the templates, that frame is determined as a feature image frame.

(4) The area of an object region for each image frame is calculated, the difference (peak-to-peak value) between the maximum and minimum areas of several successive frames is calculated, and when the peak-to-peak value has exceeded a value, which is set separately, a frame that gives the maximum area (or minimum area) is determined as a feature image frame.

Upon extracting an object region, a monochrome background may be prepared in advance, and the chroma-key method that extracts a color region different from the background color as an object region may be used. Upon calculating the area of an object region, the object region may be extracted using, e.g., the chroma-key method, and the number of pixels of that region may be calculated as the area. As criteria used upon determining a similarity with a template image, for example, an area St of an object region of a template, an area Se of an extracted object region, and an area Sc of overlapping region between the object region of the template and the extracted object region are calculated, and when a smaller one of two values (Sc/St) and (Sc/Se) is equal to or larger than a threshold value, a high similarity may be determined.

A method suited to an object of target strobe composition is selected in advance from these methods, and a feature image frame is detected by the selected method, thus improving the detection precision of a feature image frame. Therefore, the serviceability of the fully automatic strobe composition system can be improved. As a result, the time required to generate a strobe composite image can be shortened.

(Present Preset)

The quality of a strobe composite image to be generated by the 1-instruction type strobe composition system or fully automatic strobe composition system depends on the types of input images and the strobe composition algorithm. For example, when an object region of each objective frame is extracted by the chroma-key method, a threshold value which sets a background color range in a color space must be controlled. If the user can set a parameter such as a threshold value in the chroma-key method or the like, high quality can be obtained. However, when the user must set such parameter for each strobe composition, the load on user's operations increases, and the time required for strobe composition is prolonged. Hence, some different parameters are prepared in advance, and the user can preferably select a parameter to be used before strobe composition. In this manner, the quality of a strobe composite image can be improved, and high work efficiency can be assured.

(Present Last Frame of Strobe Image or Playback Moving Image)

Figure 30:
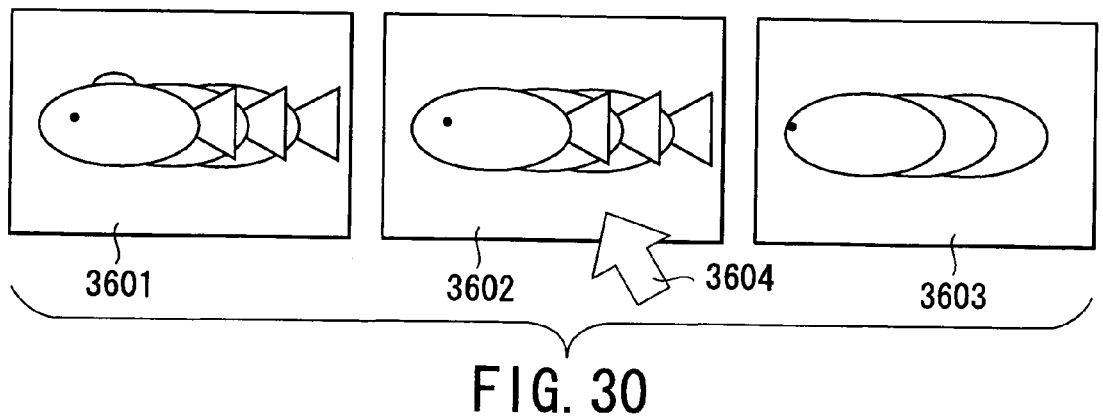
FIG. 30 shows an example of a user interface used to make the user select a desired strobe composite image.

It is often difficult for some input images to determine a strobe composition parameter in advance. In this case, parameter candidates are limited to several types, and strobe composition is made using all these candidates. Then, the obtained results are presented to prompt the user to select one of these results. In this way, the user can obtain a desired output image. For example, on a user interface using a mouse and display screen, strobe composition is made using three different parameters, and the user selects a desired strobe composite image from last frames of strobe composition presented on fields 3601, 3602, and 3603 by mouse operation, as shown in FIG. 30. In place of the last frames, strobe composite moving images may be played back. With this method, even when sufficiently high quality cannot be achieved by user's parameter setup operation, the user's operation can be minimized, and the time required for strobe composition can be consequently shortened.

Figure 31:
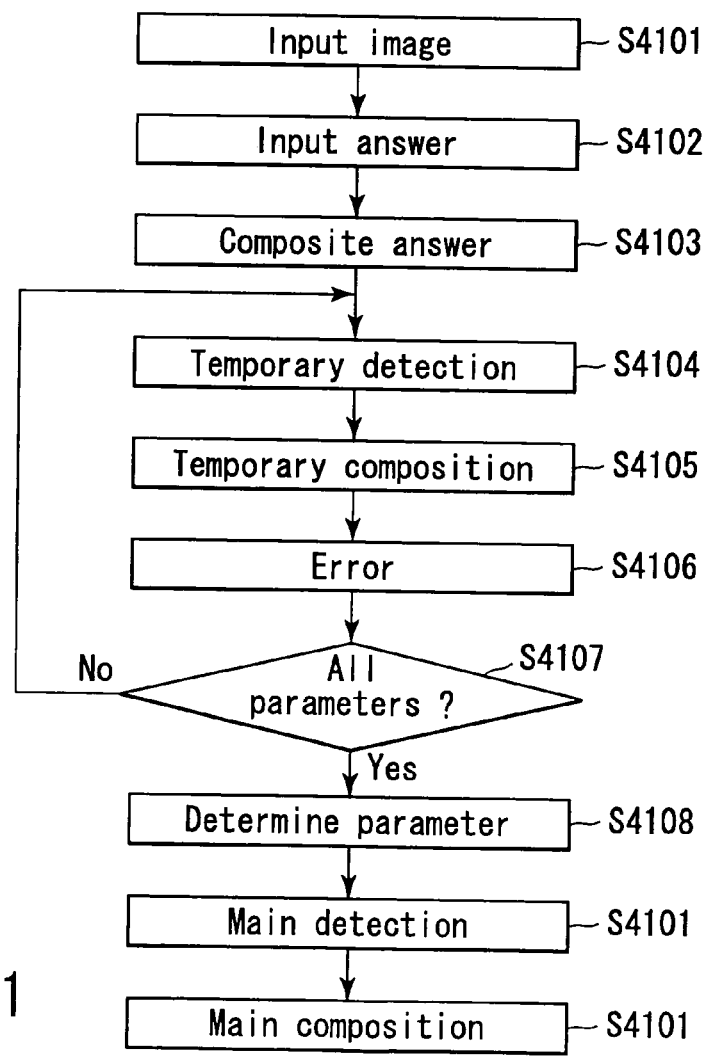
FIG. 31 is a flow chart of a strobe image composition method according to the sixth embodiment of the present invention.

(Sixth Embodiment) FIG. 31 is a flow chart of strobe image composition according to the sixth embodiment of the present invention. In this embodiment, automatic extraction parameters used in strobe image composition are determined in advance. This embodiment will take a sport game as an example, and will explain a case wherein a strobe image is generated based on capturing an image of a player during that game.

Before the game, a moving image of a player (object) is captured into a personal computer as answer data (S4101). That moving image is displayed on the display of the personal computer while being frozen frame by frame, and the user accurately inputs a player region of each frame using a mouse or the like (S4102). Images obtained by extracting the player regions are superposed while being overlaid frame by frame, thus generating a strobe composite image (S4103). This strobe composite image has very high composition quality, and will be referred to as an answer strobe composite image hereinafter.

Figure 32:
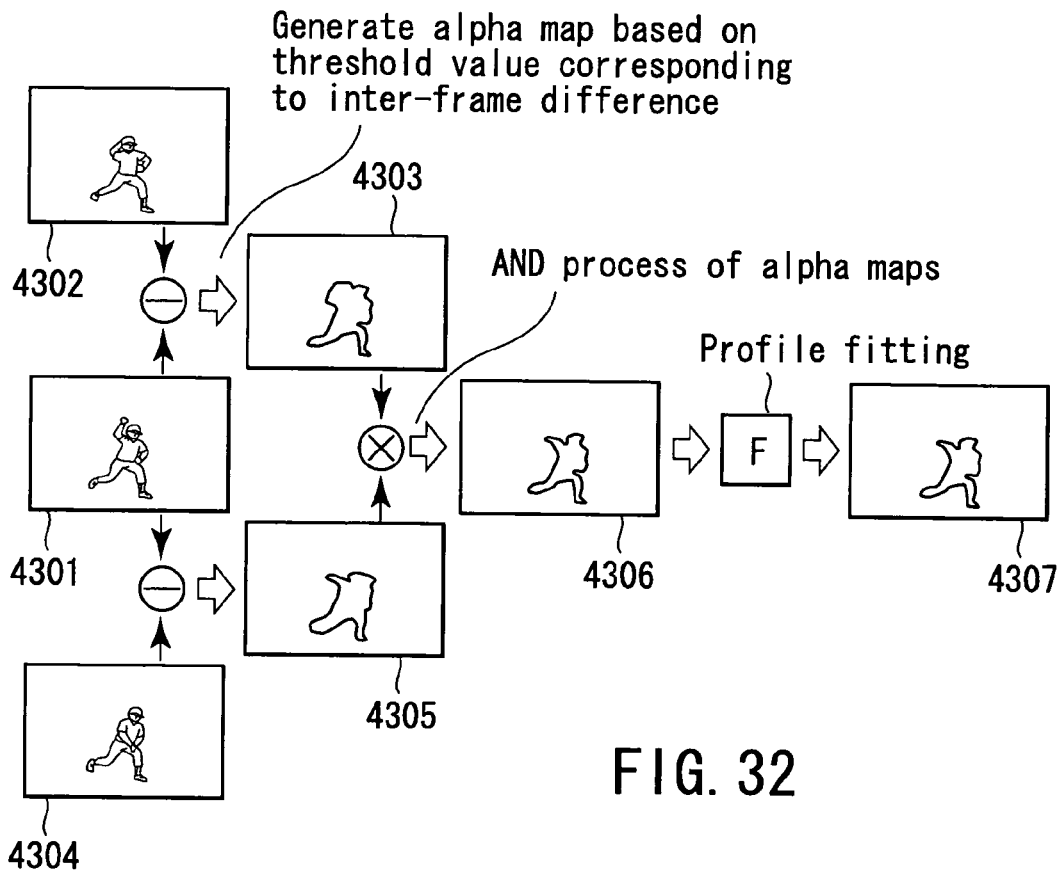
FIG. 32 shows an example of a process for automatically extracting a region from an image for answer data.

A player region is automatically extracted from the answer data image. FIG. 32 shows an example of the extraction method. The difference between the luminance values of a frame 4301 to be extracted and another reference frame 4302 is calculated. If this inter-frame difference is larger than a threshold value, an object region is determined; otherwise, a background region is determined, thus generating an alpha mask 4303. The alpha mask is a bitmap comprising two values, i.e., the object region and background region.

A plurality of alpha masks 4305 based on differences from other reference frames 4303 are generated, and their object regions are locally ANDed to obtain an alpha mask 4306 of an accurate object region. Finally, the obtained alpha mask undergoes profile fitting using a method described in reference "Profile Fitting based on Self-similar Mapping" (Ida, et al., 5th Image Sensing Symposium lecture papers C-15, pp. 115–120, June 1999) or the like, thus obtaining a more accurate alpha mask 4307. Profile fitting is a profile extraction process for obtaining a profile which suffers less errors from a profile which suffers many errors.

In case of the aforementioned extraction method according to this embodiment, extraction parameters include a threshold value used to determine an object or background region, a frame interval between the objective frame and reference frame, profile fitting strength, and the like.

The extraction parameters are temporarily set to certain values, and player regions are extracted (S4104). Based on the extraction results of the player regions, a temporary strobe composite image is generated (S4105). The temporary strobe composite image normally has poorer quality than the answer strobe composite image. In order to estimate the degree of quality deterioration, errors of the temporary strobe composite image from the answer strobe composite image are calculated (S4106). Some combinations of parameters may be determined, and steps S4104 to S4106 are repeated while switching parameters within the range of these combinations. That is, if all predetermined parameters are used, the flow advances to the next step; otherwise, the flow returns to step S4104 (S4107).

After steps S4104 to S4106 are repeated for all the parameters, parameters which correspond to minimum errors of the temporary strobe composite image from the answer strobe composite image are formally determined as those which are applied to the subsequent process (S4108). The parameters determined in this step will be referred to as execution parameters in this embodiment. Object regions are extracted from images other than the answer data images, which are captured during a game (S4109), and a strobe composite image is generated (S4110).

Optimal values of the extraction parameters depend on environmental changes such as a player's uniform color, background color, noise feature produced upon capturing an image by a camera, and the like. However, these environments remain the same during an identical game, and satisfactory composition can be attained without switching parameter values. According to this embodiment, parameter values which can obtain a satisfactory composite image even during a game can be determined. In this manner, automatic composition that does not require any manual operations can be implemented, and a strobe composite image can be generated within a short period of time.

Note that a characteristic feature of this embodiment is to evaluate errors using a composite image in place of an extracted region shape. As described in the third embodiment, in case of strobe image composition, region shape errors do not influence a composite image. Even when a background portion is temporarily extracted as a player region, an identical background image is overwritten on the background portion which remains the same, thus obtaining the same composition result as that obtained when this portion is not detected as a player region. As the errors, for example, differences may be calculated between corresponding frames, and the sum or square sum of the absolute values of the differences may be used.

Figure 33:
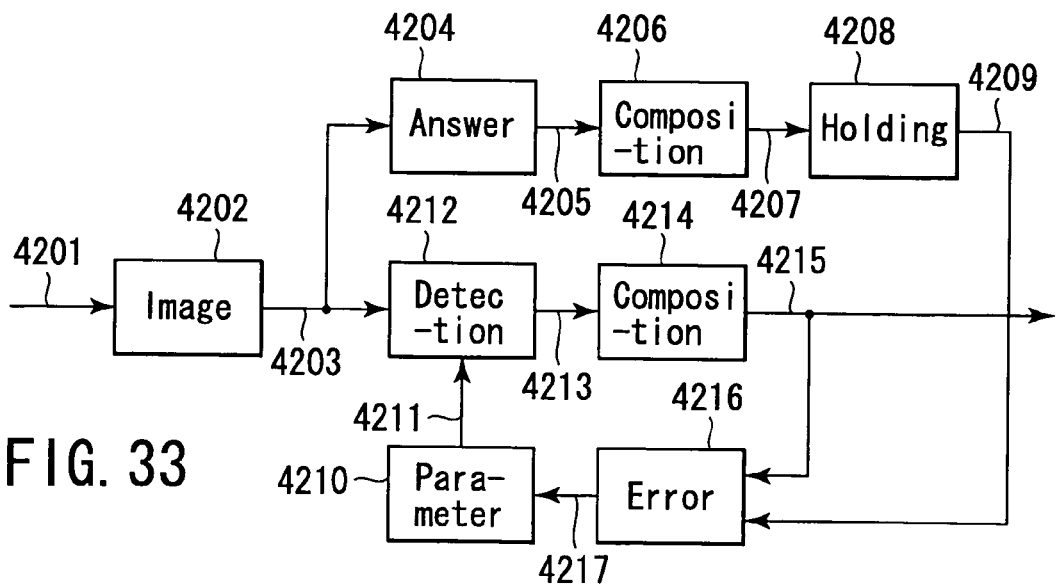
FIG. 33 is a schematic block diagram showing the arrangement of a strobe image composition apparatus according to the seventh embodiment of the present invention.

(Seventh Embodiment) FIG. 33 is a schematic block diagram showing the arrangement of a strobe image composition apparatus according to the seventh embodiment of the present invention. The seventh embodiment relates to a practical apparatus which executes a series of processes of strobe image composition that have been explained in the sixth embodiment.

A captured image 4201 is input, and is held in a storage unit 4202 such as a semiconductor storage element, magnetic recording device, or the like in case of, e.g., a personal computer. An image 4203 is sent as an answer data image to a setting unit 4202 which sets an answer object region. For example, the image 4203 is displayed on the display of the personal computer, and the user accurately inputs an object region using a mouse or the like. An answer object image 4205 extracted based on the input region is sent to a composition unit 4206. The composition unit 4206 overwrites the object image 4205 in the order of time, and sends an answer strobe composite image 4207 to a holding unit 4208.

On the other hand, the image 4203 is also sent to an object region detection unit 4212. The detection unit 4212 detects an object region on the basis of extraction parameter values 4211 sent from a parameter setting unit 4210, and an object image 4213 extracted based on that region is sent to a composition unit 4214. The composition unit 4212 overwrites the object image 4213 in the order of time, and sends a strobe composite image 4215 to an error detection unit 4216. The answer strobe composite image 4207 is sent from the holding unit 4208 to the error detection unit 4216. The error detection unit 4216 calculates errors 4217 between the answer strobe composite image 4207 and strobe composite image 4215. The calculated errors 4217 are sent to the parameter setting unit 4210.

The parameter setting unit 4210 sequentially switches the parameter values 4211, checks the result obtained based on the switched parameter values, and obtains parameter values which can minimize the errors 4217. When another image 4201 is input, the parameter values 4211 are sent to the detection unit 4212, which detects an object region from an image 4203 read out from the storage unit 4202. An object image 4213 undergoes strobe image composition by the composition unit 4214. A strobe composite image 4215 obtained as a result of this process is externally output.

With this arrangement, the second and subsequent input images can be automatically processed, and a strobe composite image can be generated within a short period of time.

Figure 34:
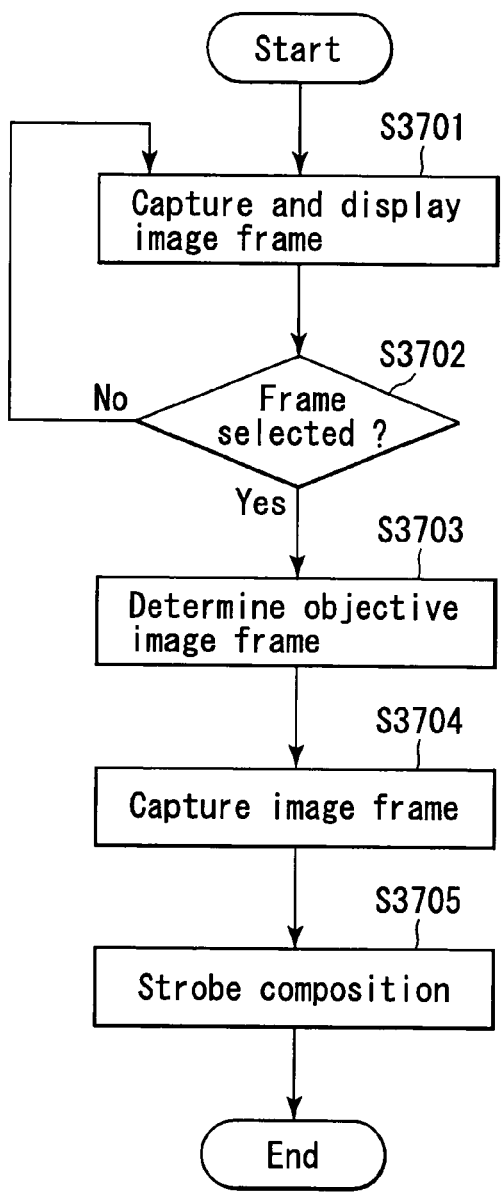
FIG. 34 is a flow chart of a strobe image composition method according to the eighth embodiment of the present invention.

(Eighth Embodiment) The eighth embodiment of the present invention allows the user to select an image frame used in composition of a strobe image while observing a slow playback video of an object moving image. The eighth embodiment is executed from step S3701 in accordance with a series of procedures shown in FIG. 34. Prior to a description of contents executed in respective steps, a term "superposing manner switching frame" is used as follows. More specifically, upon generating a strobe composite image by superposing a plurality of frames of a moving image, an image frame at which a superposing manner (overlay or underlay composition) is switched will be referred to as a "superposing manner switching frame" hereinafter. The contents executed in respective steps are as follows.

Step S3701: One image frame is captured and displayed. The flow then advances to step S3702.

Step S3702: A user's image frame selection instruction is accepted. If no instruction is detected within a predetermined period of time, the flow returns to step S3701. Upon detection of an instruction, the flow advances to step S3703.

Step S3703: The image frame displayed in step S3701 immediately before the user's instruction accepted in step S3702 is determined as a superposing manner switching frame. A position shifted from the position of that superposing manner switching frame by a predetermined value in the time direction is determined as a start point. Also, a position shifted by another predetermined value is determined as an end point. Then, a predetermined number of image frames at predetermined intervals of those from the start point to the end point are determined as objective image frames which are to undergo strobe composition. After that, the flow advances to step S3704.

Step S3704: If image frames to be captured of those which are determined in step S3703 and are to undergo strobe composition still remain, these frames are captured. The flow then advances to step S3705.

Step S3705: The image frames which are determined in step S3703 and are to undergo strobe composition are superposed to generate a strobe composite image. A series of procedures end.

Conventionally, the user cannot often accurately select a desired image frame while observing a video played back at a frame rate unique to a moving image of an object if he or she makes such attempts. However, according to this embodiment, the user can accurately select a desired image frame. As a result, the time required until a strobe composite image can be shortened.

Note that this embodiment can be modified as follows.

(1) When the user issues a wrong instruction to be accepted in step S3702, he or she must quit the series of procedures and redo them to correct errors. In order to allow the user to correct such errors, it is preferable that an image displayed when the user has found errors revert to a previously displayed image, and wrong operations be redone retrospectively.

(2) In step S3701, an image is displayed. If the user can determine the image display time, user errors due to an instruction accepted in step S3702 can be reduced. The display time may be changed during image display.

(3) One image frame is sequentially captured in step S3701, and a required number of image frames are also captured in step S3704. In place of these processes, image frames may be simultaneously captured, or a plurality of image frames may be captured in step S3701.

(4) The superposing manner switching frame, and the start and end points are determined in step S3703 in accordance with the user's instruction accepted in step S3702. In this case, an image frame corresponding to the user's instruction is determined as a superposing manner switching frame. Alternatively, for example, an image frame corresponding to the user's instruction may be determined as the start or end point.

(5) When the overlay and underlay composition modes need not be switched, the superposing manner switching frame need not be determined. Hence, in such case, the start and end points may be automatically determined with reference to an image frame corresponding to the user's instruction. In this way, the number of times of user's operations can be reduced, and the time required until a strobe composite image can be shortened.

(6) The superposing manner switching frame, and the start and end points are determined in accordance with one user's instruction accepted in step S3702. In order to obtain a strobe composite image that the user wants, one image frame may be determined based on one user's instruction in place of a plurality of image frames. Such modification is effective when a strobe composite image with sufficiently high quality cannot be generated based on only one user's instruction, and this embodiment can be applied to more images.

(7) When the start point alone is determined but the end point is not determined yet, and when execution of step S3705 starts immediately after the start point is determined, the time required from determination of the end point until completion of strobe composition can be shortened.

Figure 35:
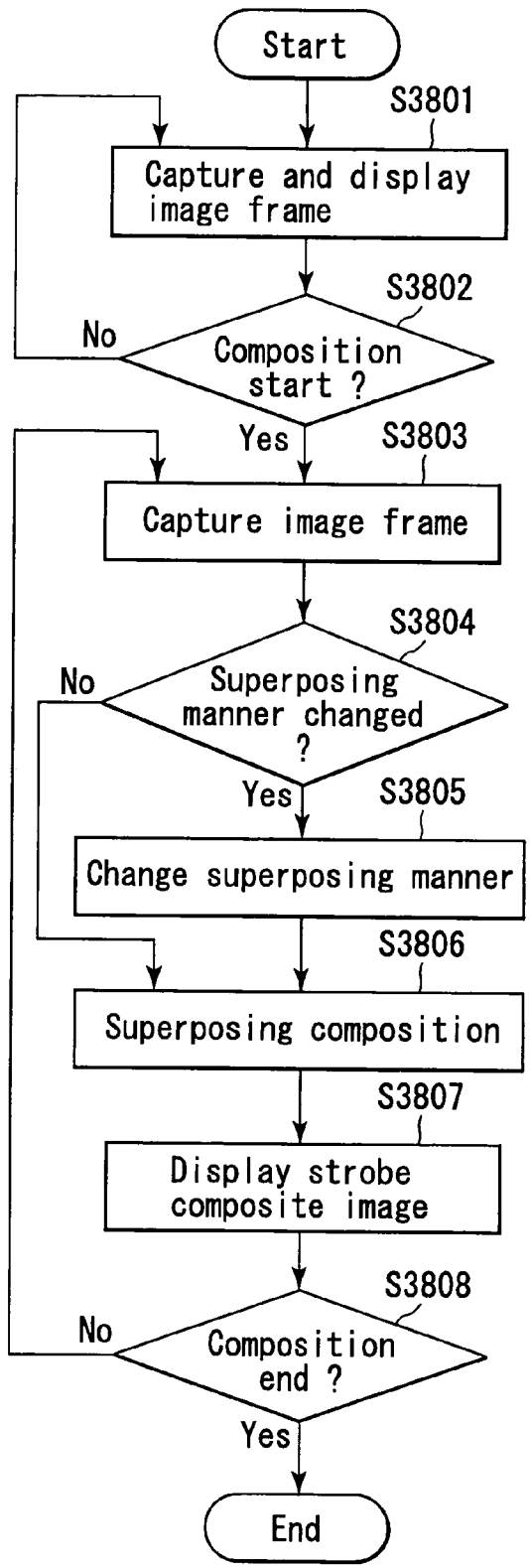
FIG. 35 is a flow chart of a strobe image composition method according to the ninth embodiment of the present invention.

(Ninth Embodiment) The ninth embodiment of the present invention allows the user to select an image frame while observing a playback video of an object strobe composite moving image. The ninth embodiment is executed according to a series of procedures shown in FIG. 35. The series of procedures are executed from step S3801. The contents executed in respective steps are as follows.

Step S3801: One image frame is captured and displayed. The flow then advances to step S3802.

Step S3802. A user's strobe composition start instruction is accepted. If no instruction is detected within a predetermined period of time, the flow returns to step S3801. Upon detection of an instruction, the flow advances to step S3803.

Step S3803: One frame image is captured. The flow then advances to step S3804.

Step S3804: A user's instruction which indicates if a superposing manner (overlay or underlay composition) is to be changed upon generating a strobe composite image by superposing image frames is accepted. If a change instruction is detected, the flow advances to step S3805. If no instruction is detected within a predetermined period of time, the flow jumps to step S3806. Or if an instruction indicating that the method is not changed is detected, the flow jumps to step S3806.

Step S3805: A superposing manner (overlay or underlay composition) used upon generating a strobe composite image by superposing image frames is changed. After that, the flow advances to step S3806.

Step S3806: The image frames are superposed in accordance with the superposing manner to generate a strobe composite image. After that, the flow advances to step S3807.

Step S3807: The strobe composite image generated in step S3806 is displayed. The flow then advances to step S3808.

Step S3808: A user's instruction indicating if strobe composition is to quit is accepted. If no instruction is detected within a predetermined period of time, the flow returns to step S3803. Or if an instruction indicating that the process does not quit is detected, the flow returns to step S3803. If a quit instruction is detected, the series of procedures quit.

According to this embodiment, since strobe composition, playback of a strobe composite moving image, and selection of image frames can be simultaneously done, the time required until strobe composition that the user wants is completed can be shortened.

Note that the ninth embodiment can be modified as follows.

(1) When the user issues a wrong instruction to be accepted in step S3802, S804, or S3808, he or she must quit the series of procedures and redo them to correct errors. In order to allow the user to correct such errors, it is preferable that an image displayed when the user has found errors revert to a previously displayed image, and wrong operations be redone retrospectively.

(2) In steps S3801 and S3807, an image is displayed. If the user can determine the display time of these images, user errors due to instructions accepted in steps S3802, S3804, and S3808 can be reduced. The display time may be changed during image display.

(3) One image frame is sequentially captured in each of steps S3801 and S3803. For example, image frames may be simultaneously captured, or a plurality of image frames may be captured in steps S3801 and S3803.

(4) Upon accepting a user's instruction in step S3804, the superposing manner upon strobe composition is changed. A position shifted from the position of an image frame corresponding to that user's instruction in the time direction may be determined as an end point. In this case, when an image frame corresponding to that end point is superposed to generate a strobe composite image, and that strobe composite image is displayed, the series of procedures end. In this way, one of user's instructions can be omitted, and the time required until strobe composition is completed can be shortened.

(5) The position shifted in the time direction may be determined as a start point in place of the end point. In this way, if image frames at positions shifted from the position of an image frame corresponding to a given user's input are determined as those corresponding to the start and end points, and a frame as the boundary upon switching the superposing manner, even when the user's instruction accepted in step S3802 includes wrong contents, operations need not be redone or corrected, thus shortening the time required for strobe composition.

(6) In the ninth embodiment, a strobe composite image is displayed simultaneously with strobe composition. The strobe composite image may be stored in a storage unit, and may be played back later.

Figure 36:
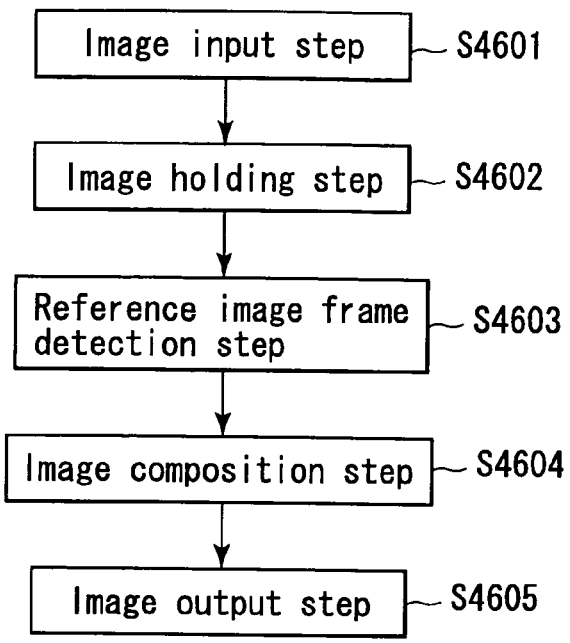
FIG. 36 is a flow chart of a strobe image composition method according to the 10th embodiment of the present invention.

(10th Embodiment) FIG. 36 is a flow chart showing the flow of processes of a strobe image composition method according to the 10th embodiment of the present invention. Referring to step S36, S4601 is an image input step of sequentially inputting time-serial image frames; S4602, an image holding step of holding latest N image frames (N is a natural number) input in the image input step; S4603, a reference image frame detection step of detecting a reference image frame serving as a reference for a plurality of image frames, which are to undergo strobe image composition, on the basis of strobe image composition conformity conditions used to determine if a given image frame conforms to strobe image composition; S4604, an image composition step of executing a strobe image composition process for the plurality of image frames stored in the image holding step when a predetermined period of time is elapsed after detection of the reference image frame; and S4605, an image output step of outputting a composite image frame that has undergone the strobe image composition process in the image composition step.

The image input step S4601 corresponds to a step of capturing and inputting an object image which is to undergo strobe composition like camera shooting in a sports live program. In this step, time-serial image frames are input sequentially. The image holding step S4602 is holding the latest N image frames input in the image input step S4601. For example, frames for latest 2 sec (60 frames at 30 [fps]) of a sports live video are held while always updating the held contents of a storage medium with a limited capacity.

The reference image frame detection step S4603 detects a reference image frame serving as a reference for a plurality of image frames, which are to undergo strobe image composition, on the basis of the strobe image composition conformity conditions used to determine if the currently held image sequence are image frames suited to strobe image composition while the latest N images are held in the image holding step S4602. For example, when video frames of a baseball live program are input in the image input step S4601, the image sequence which is to undergo the strobe composition process includes a pitching scene of a pitcher, a hitting scene of a batter, and a plurality of image frames of a ball. Note that the reference image frame corresponds to a frame at the instance when a pitcher releases a ball or a frame at the instance when a batter hits a ball, and a desired strobe composite image can be generated by superposing frames before and after that reference image frame. The strobe image composition conformity conditions include, e.g., a condition using image information, and that using additional information different from image information. The condition using image information uses information only in images. On the other hand, the condition using additional information different from image information obtains additional information different from image information in another input step synchronous with the image input step. In this case, a microphone, infrared sensor, scale, or physical switch is used. Based on these two conditions, a reference image frame can be detected as follows.

(Condition Using Image Information)

A frame from which an image frame similar to an image, which is registered in advance, is detected is detected as a reference image frame. For example, the image registered in advance is an image frame at the instance of impact.

A frame from which a change in pixel value of a partial region, which is set in a frame in advance, is detected is detected as a reference image frame. For example, when a position where a golf ball is placed is set as the partial region, a frame in which white pixels have changed to green pixels is detected as the reference image frame. Also, a frame when a baseball bat has passed a given region is detected as the reference image frame.

When a mask image similar to a mask image which is set in advance (a binary image used to separately extract an object region and background region) is generated, an original image frame of this mask image is detected as a reference image frame.

A frame which has a minimum area of an object region in a mask image generated from an image frame is detected as a reference image frame. A hitting scene of baseball or a swing scene of golf normally has a minimum area of an object region at the instance of impact.

(Condition Using Additional Information Different from Image Information)

Upon detection of a sound which is set in advance, a frame corresponding to that detection timing is detected as a reference image frame. The sound to be detected includes a hitting sound of baseball, an impact sound of golf, and the like.

When the infrared sensor detects an object to be detected, a frame corresponding that detection timing is detected as a reference image frame. For example, an image frame corresponding to a timing at which the infrared sensor detects that a baseball bat, pitcher's arm, or golf club has passed a prescribed point, or a timing at which the sensor detects that a ball placed on a golf tee or artificial turf mat has disappeared is detected as the reference image frame.

When a change in weight is detected, a frame corresponding to that detection timing is detected as a reference image frame. A frame at a timing at which the weight of a golf tee or artificial turf mat has changed is often suited to a reference image frame.

When the physical switch operates, a frame corresponding to that operation timing is detected as a reference image frame. For example, a timing at which a pitcher steps on a pitching plate, a timing at which a pressure acts on a golf tee or artificial turf mat, or the like may be detected.

The image composition step S4604 executes strobe image composition of the plurality of image frames stored in the image holding step S4602 on the basis of the reference frame detected in the reference image frame detection step S4603. In this case, the plurality of image frames stored in the image holding step S4602 may undergo strobe composition immediately after the reference image frame detection step S4603 detects a reference image frame. Alternatively, the plurality of image frames stored in the image holding step S4602 may undergo strobe composition when a predetermined period of time elapses after detection of a reference image frame. The former process is executed when the reference image frame is detected as the last frame of the plurality of frames which are to undergo strobe composition. The latter process is executed when the reference image frame is detected as a middle one (e.g., the instance of impact of hitting of baseball or golf swing) of the plurality of frames which are to undergo strobe composition. As the number of frames which are to undergo strobe composition, all image frames held in the image holding step S4602 may be used, or a predetermined number of frames, e.g., (2M+1) frames, i.e., M frames before and after the reference image frame, may undergo strobe composition.

The image output step S4605 outputs a composite image frame that has undergone the strobe composition process in the image composition step S4604 as display data or a video file.

Detecting the reference image frame serving as a reference for a plurality of frames, which are to undergo strobe image composition, on the basis of the strobe image composition conditions used to determine an image frame is suited to storage image composition amounts to automatic designation of a period of the plurality of image frames. In this way, a system which can shorten the time required from photographing until a strobe composite video is output, and can output a strobe composite image without the intervention of operator's processes can be realized.

Figure 37:
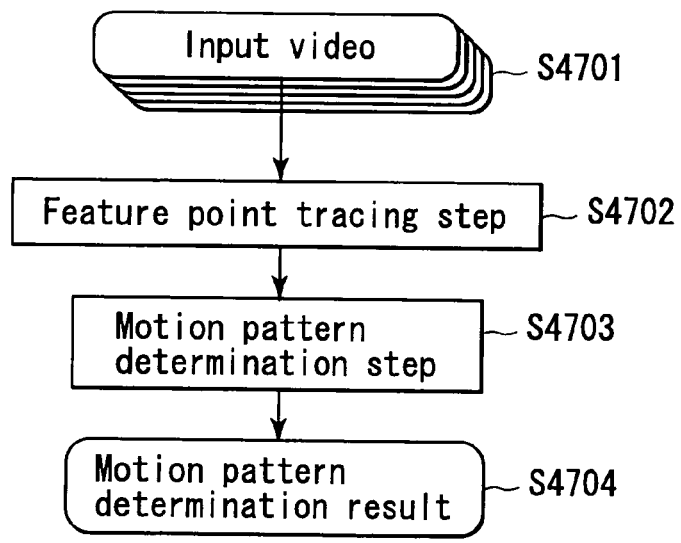
FIG. 37 is a flow chart of a strobe image composition method according to the 11th embodiment of the present invention.

(11th Embodiment) FIG. 37 is a flow chart of a strobe image composition method according to the 11th embodiment of the present invention. Referring to FIG. 37, reference numeral 4701 denotes an input video which is input to generate a strobe composite image, and includes a plurality of image frames that represent an object; 4702, a feature point tracing step of obtaining the moving locus of a feature point of an object; 4703, a motion pattern determination step of making motion analysis of the object on the basis of the obtained locus pattern; and 4704, a motion pattern determination result determined in the motion pattern determination step.

Figure 38A:
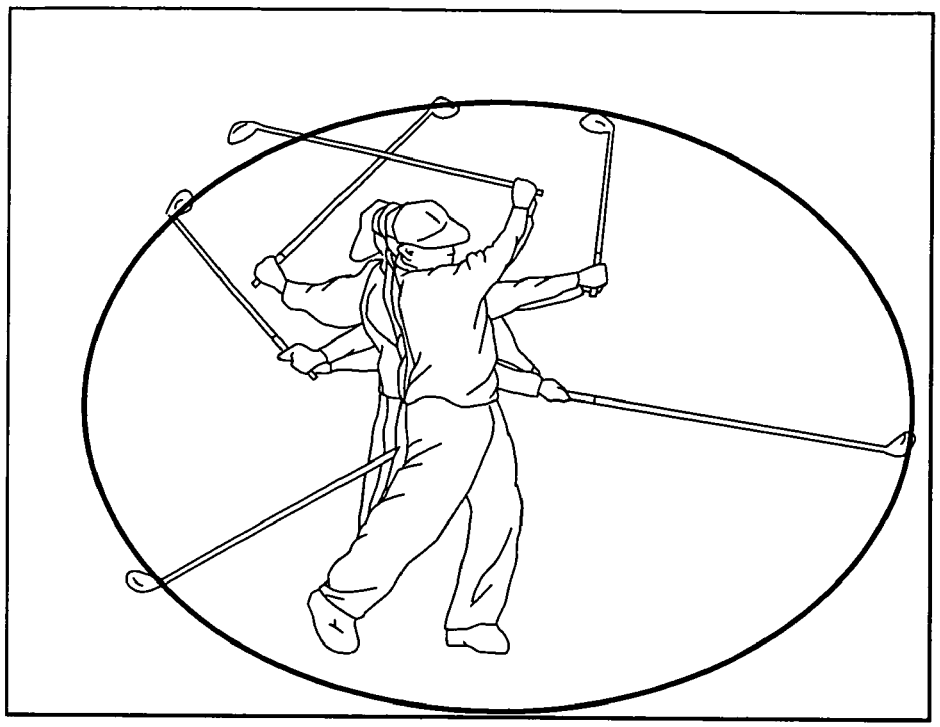
FIGS. 38A and 38B show examples of feature point tracing results.
Figure 38B:
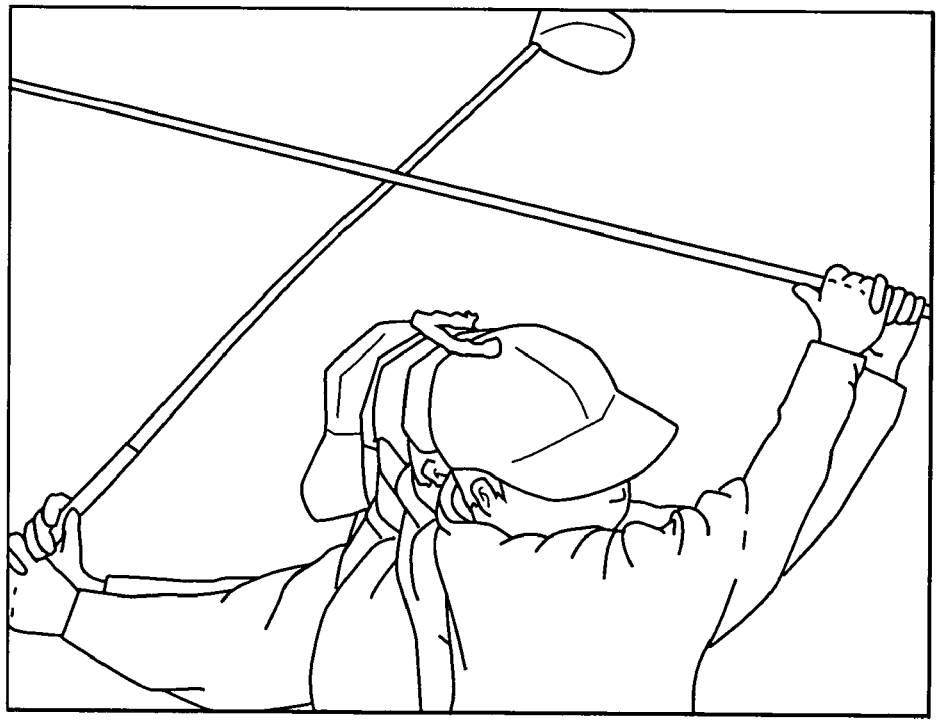

The feature point tracing step 4702 traces a feature point of an object that appears in the input video 4701. The user may manually trace the feature point using a pointing device, or the feature point may be automatically traced using color information of an image. Upon tracing, for example, a histogram intersection method which generates a color distribution histogram of a rectangular region around the feature point, and searches for regions having similar color distribution histograms in respective frames can be used. If an input video has already undergone strobe composition, a plurality of feature points are superposed on a single image frame, and the feature point can be traced more easily. FIGS. 38A and 38B show the tracing results of a club head and a golfer's head top in golf swing as examples of the traced feature points. FIG. 38B shows an image around the head of an object shown in FIG. 38A in an enlarged scale, and shows the locus of the golfer's head top.

Figure 39A:
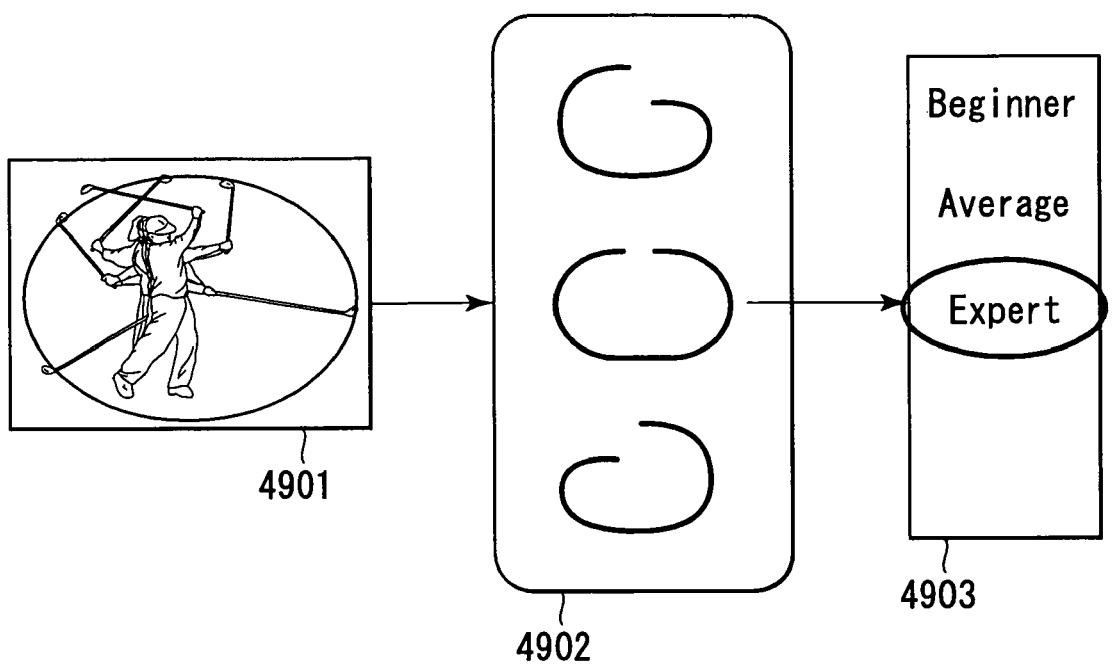
FIGS. 39A and 39B show the execution state of a motion pattern determination step.
Figure 39B:
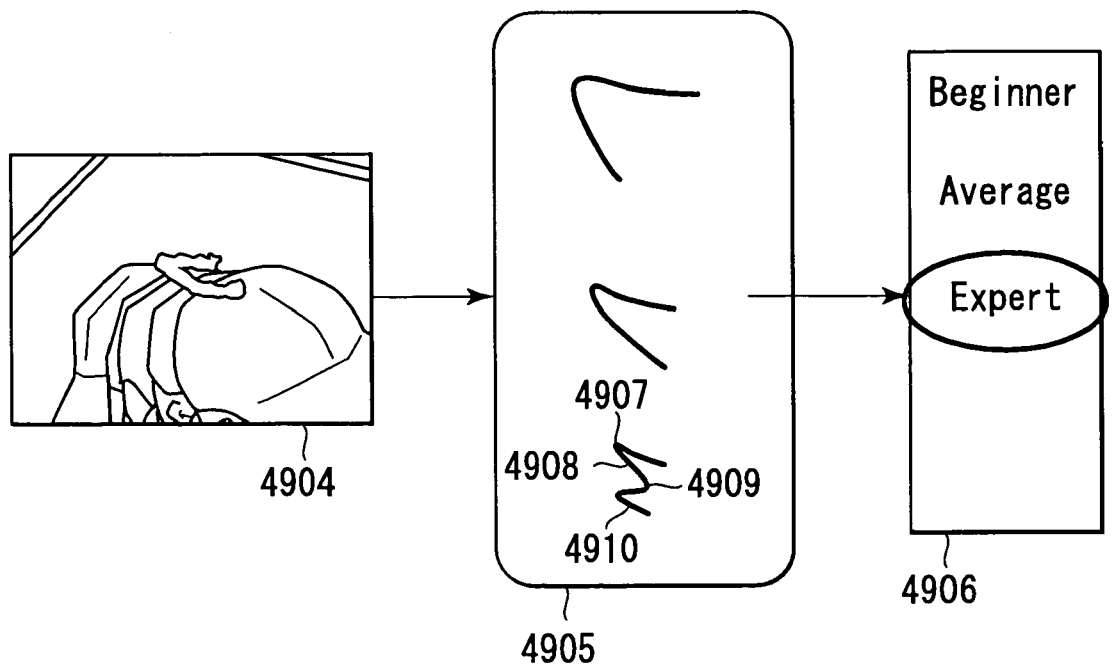

FIGS. 39A and 39B show the execution state of the motion pattern determination step. The motion pattern determination step 4703 makes motion analysis of an object on the basis of the pattern of the feature point tracing result as the locus of the feature point obtained in the feature point tracing step 4702. Note that FIG. 39A shows a case wherein the motion pattern of the club head is analyzed, and FIG. 39B shows a case wherein the motion pattern of the golfer's head top is analyzed. In FIGS. 39A and 39B, reference numerals 4901 and 4904 denote inputs to the motion pattern determination step 4703, which correspond to the feature point tracing results output from the feature point tracing step 4702. Reference numerals 4902 and 4905 denote motion pattern determination units each of which determines a motion pattern by comparing the pattern of the feature point tracing result with a pattern registered in advance. Reference numerals 4903 and 4906 denote output examples of the motion analysis results determined by the motion pattern determination units 4902 and 4905.

In the locus pattern of the club head of golf, when a player is viewed from his or her front side, if the swing locus of the follow-through is larger than that through the downswing, a good, relaxed swing that exploits the weight of the club head is normally determined. A club head motion pattern which represents such good swing, that which represents a poor swing, that which represents a swing incident to a beginner, and the like are registered in advance in the motion pattern determination unit 4902. One of the registered motion patterns, which is most similar to the input 4901 of the motion pattern, is selected, and the motion analysis result 4903 is output. In the example of FIG. 39A, the motion analysis result 4903 indicating "expert" is obtained based on the input motion pattern 4901.

As for the locus pattern of the golfer's head top, when a player is viewed from his or her front side, a pattern which suffers less deviations in the horizontal and vertical directions is determined as a good swing in which the upper body does not sway and the backbone axis is stable.

In an expert's swing, from a state wherein the weight has shifted to the right foot on the take-back (a state 4907 wherein the locus moves to the left end in FIG. 39B), the weight shifts to the left foot toward impact at which the golfer hits a ball (the locus moves to the right, as indicated by 4908 in FIG. 39B). Immediately before the impact, a club head and arms pull at each other to accelerate the club head (at this time, the locus of the head top moves to the left in FIG. 39B again), and the impact is reached in a behind-the-ball state 4909. After the impact, the weight naturally shifts to the left foot (4910). This is the motion pattern of the head top in the expert's swing.

As in the aforementioned club head, a head top motion pattern which represents the expert's swing, that which represents a poor swing, that which represents a swing incident to a beginner, and the like are registered in advance in the motion pattern determination unit 4902. One of the registered motion patterns, which is most similar to the input 4901 of the motion pattern, is selected, and the motion analysis result 4906 is output. In the example of FIG. 39B, the motion analysis result 4906 indicating "expert" is obtained based on the input motion pattern 4904.

According to this embodiment described above, in an image composition method that generates a strobe composite image by superposing a plurality of frames of a moving image, the moving locus of a feature point of an object is obtained, and the motion analysis of the object is made on the basis of the obtained locus pattern. Thus, not only a strobe composite image is visually output, and a motion analysis result that can lead to improvement of the athletic ability and the like can be output together.

Figure 40:
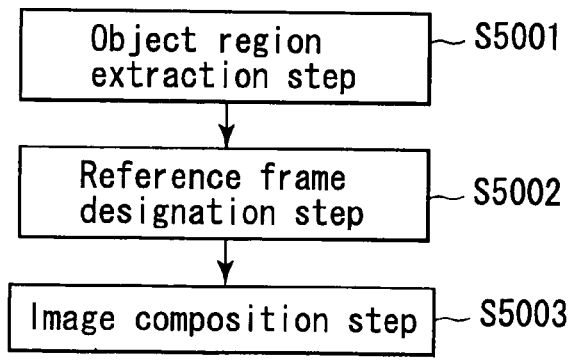
FIG. 40 is a flow chart showing the flow of processes of a strobe image composition method according to the 12th embodiment of the present invention.

(12th Embodiment) FIG. 40 is a flow chart of a strobe image composition method according to the 12th embodiment of the present invention. Referring to FIG. 40, S5001 is an object region extraction step of extracting an object region from the currently captured image frame in real time; S5002, a reference frame designation step of designating an image frame which serves as a reference upon executing strobe composition; and S5003, an image composition step of making strobe composition using the designated reference frame and extracted object region.

The object region extraction step S5001 always extracts an object region in real time irrespective of whether or not an input image is a frame which is to undergo a strobe composition process. The reference frame designation step S5002 designates an image frame which serves as a reference upon executing strobe composition by, e.g., manual designation of the user or the automatic method described in the 10th embodiment. The image composition step S5003 makes strobe composition using the designated reference frame and extracted object region. In the strobe image composition methods described so far in the above embodiments, after an image frame serving as a reference upon executing strobe composition is designated, object regions are extracted from a plurality of frames which are to undergo strobe composition, and strobe composition is made using these object regions. However, such method suffers a problem that the object region extraction processing time is added to the time required from determination of an output video range until output of an actual video. However, as described in this embodiment, when the object region extraction process is always made in real time, this problem can be solved.

In a strobe image composition method that generates a strobe composite image by superposing a plurality of frames of a moving image, the control waits for designation of an image frame serving as a reference upon executing strobe composition, while an object region is extracted from the currently captured image frame in real time. After the reference image frame is designated, strobe composition is made using this designated reference image frame, and the extracted object regions. Hence, the time required from photographing until output of a strobe composite video can be greatly shortened.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image composition method comprising:
   inputting a first moving image;
   inputting answer object regions for respective frames of the first moving image;
   extracting a plurality of answer object images from the respective frames of the first moving image using the answer object regions;
   generating an answer strobe composite image in which the plurality of answer object images are superposed;
   determining an extraction parameter which depends on the answer strobe composite image;
   inputting a second moving image;
   extracting object images from respective frames of the second moving image using the extraction parameter; and
   generating a strobe composite image in which the object images extracted from the respective frames of the second moving image are superposed, and
   wherein the determining the extraction parameter comprises:
   (a) detecting temporary object regions from the respective frames of the first moving image using a temporary extraction parameter;
   (b) extracting a plurality of temporary object images from the respective frames of the first moving image using the temporary object regions;
   (c) generating a temporary strobe composite image in which the plurality of temporary object images are superposed;
   (d) calculating an error between the answer strobe composite image and the temporary strobe composite image; and
   repeating (a) to (d) while changing the temporary extraction parameter, and determining the temporary extraction parameter which minimizes the error as the extraction parameter.

2. An image composition apparatus, comprising:
   a unit configured to input a first moving image and a second moving image;
   a unit configured to input answer object regions for respective frames of the first moving image;
   a unit configured to extract a plurality of answer object images from the respective frames of the first moving image using the answer object regions;
   a unit configured to generate an answer strobe composite image in which the plurality of answer object images are superposed;
   a unit configured to determine an extraction parameter which depends on the answer strobe composite image;
   a unit configured to extract object regions from respective frames of the second moving image using the extraction parameter; and
   a unit configured to generate a strobe composite image in which the object images extracted from the respective frames of the second moving image are superposed, and
   wherein the extraction parameter is determined by:
   (a) detecting temporary object regions from the respective frames of the first moving image using a temporary extraction parameter;
   (b) extracting a plurality of temporary object images from the respective frames of the first moving image using the temporary object regions;
   (c) generating a temporary strobe composite image in which the plurality of temporary object images are superposed;
   (d) calculating an error between the answer strobe composite image and the temporary strobe composite image; and
   repeating (a) to (d) while changing the temporary extraction parameter, and determining the temporary extraction parameter which minimizes the error as the extraction parameter.

3. A program product comprising a computer usable medium having computer readable program code means, the computer readable program code means in the computer program product comprising:
   program code means for causing a computer to input a first moving image and a second moving image;
   program code means for causing a computer to input answer object regions for respective frames of the first moving image;
   program code means for causing a computer to extract a plurality of answer object images from the respective frames of the first moving image using the answer object regions;
   program code means for causing a computer to generate an answer strobe composite image in which the plurality of answer object images are superposed;
   (a) detecting temporary object regions from the respective frames of the first moving image using a temporary extraction parameter;
   (b) extracting a plurality of temporary object images from the respective frames of the first moving image using the temporary object regions;
   (c) generating a temporary strobe composite image in which the plurality of temporary object images are superposed;
   (d) calculating an error between the answer strobe composite image and the temporary strobe composite image; and
   repeating (a) to (d) while changing the temporary extraction parameter, and determining the temporary extraction parameter which minimizes the error as the extraction parameter.

* * * * *